United States Patent [19]
Barrett et al.

[11] 3,798,907
[45] Mar. 26, 1974

[54] DIGITAL GOVERNOR

[75] Inventors: William J. Barrett; Joseph R. Ahlgren, both of Rockford, Ill.

[73] Assignee: Woodward Governor Company, Rockford, Ill.

[22] Filed: Mar. 13, 1972

[21] Appl. No.: 233,955

Related U.S. Application Data
[62] Division of Ser. No. 177,285, Sept. 2, 1971.

[52] U.S. Cl............60/660, 290/40, 317/5, 415/30, 318/318
[51] Int. Cl............ F01k 13/02
[58] Field of Search............ 290/40; 317/5; 415/30; 60/105; 318/318

[56] References Cited
UNITED STATES PATENTS

| | | | |
|---|---|---|---|
| 3,242,346 | 3/1966 | Skoubo | 318/318 X |
| 3,331,006 | 7/1967 | Strand et al. | 318/318 X |
| 3,533,236 | 10/1970 | Cottington | 290/40 X |
| 3,566,250 | 2/1971 | Ringstad | 290/40 X |
| 3,626,247 | 12/1971 | Morse | 317/5 |

Primary Examiner—Martin P. Schwadron
Assistant Examiner—Allen M. Ostrager
Attorney, Agent, or Firm—Wolfe, Hubbard, Leydig, Voit & Osann, Ltd.

[57] ABSTRACT

Electronic governors for controlling the speed of prime movers wherein signals corresponding in frequency to actual speed and desired speed are compared to produce an error signal for controlling a prime mover actuator in accordance with the time integral of the period difference between the compared signals, the rate of integration and overall gain of the governor servo loop being completely independent of the actual speed of the prime mover. Alternative governors are disclosed which include droop and isochronous versions as well as a governor featuring proportional plus integral control. All embodiments are entirely digital in design and inherently immune to drift due to temperature and power supply variations.

14 Claims, 18 Drawing Figures

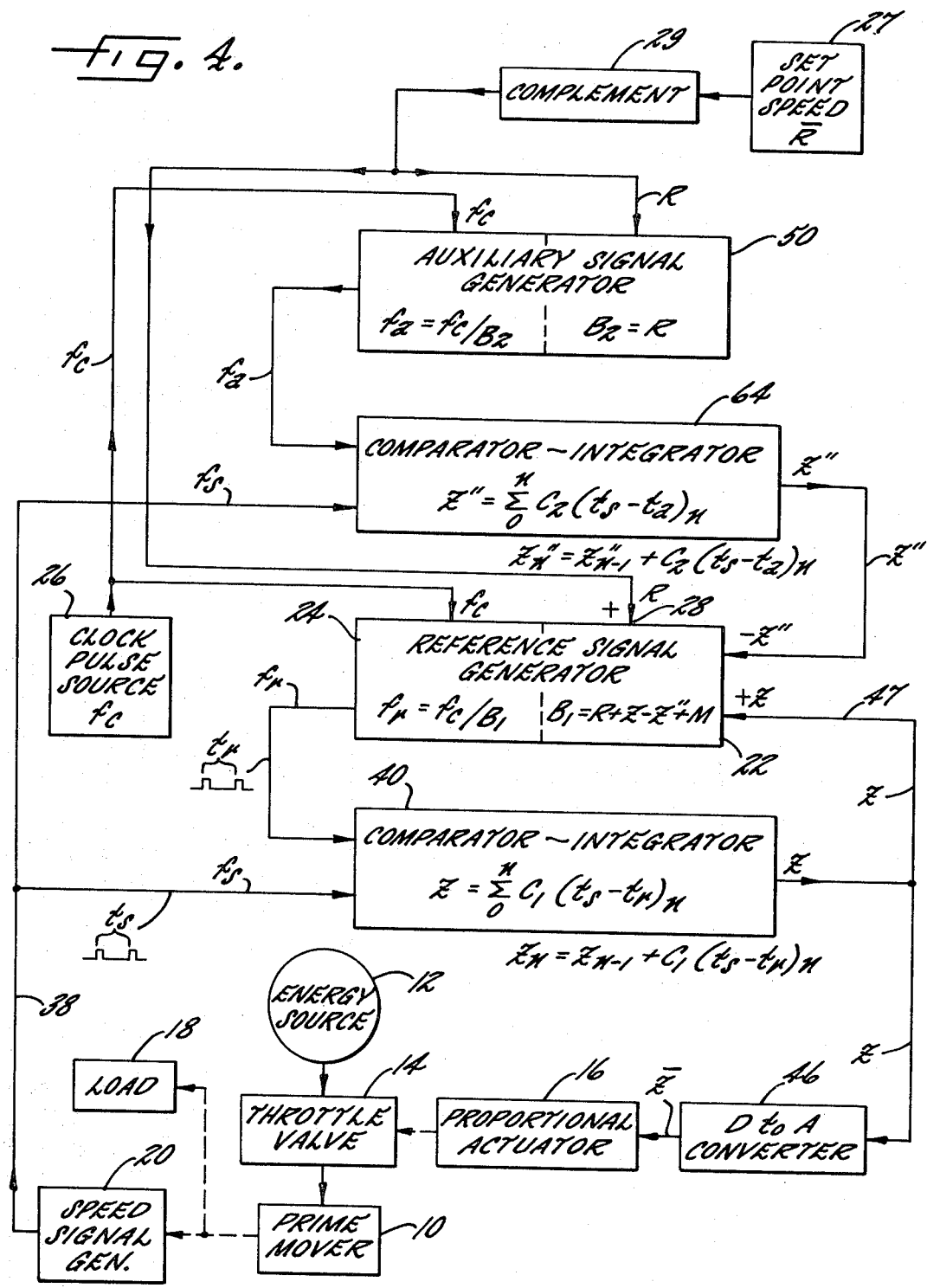

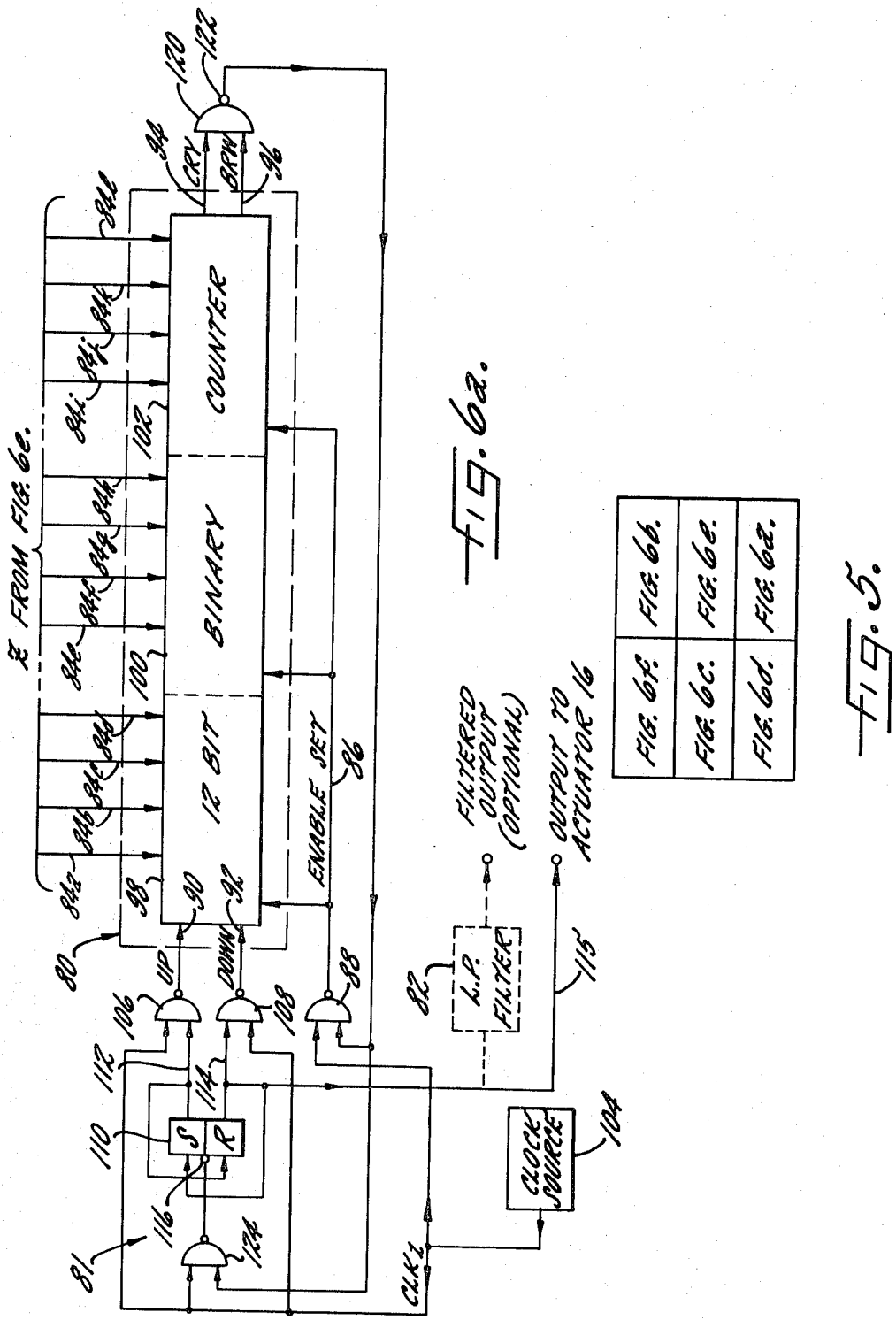

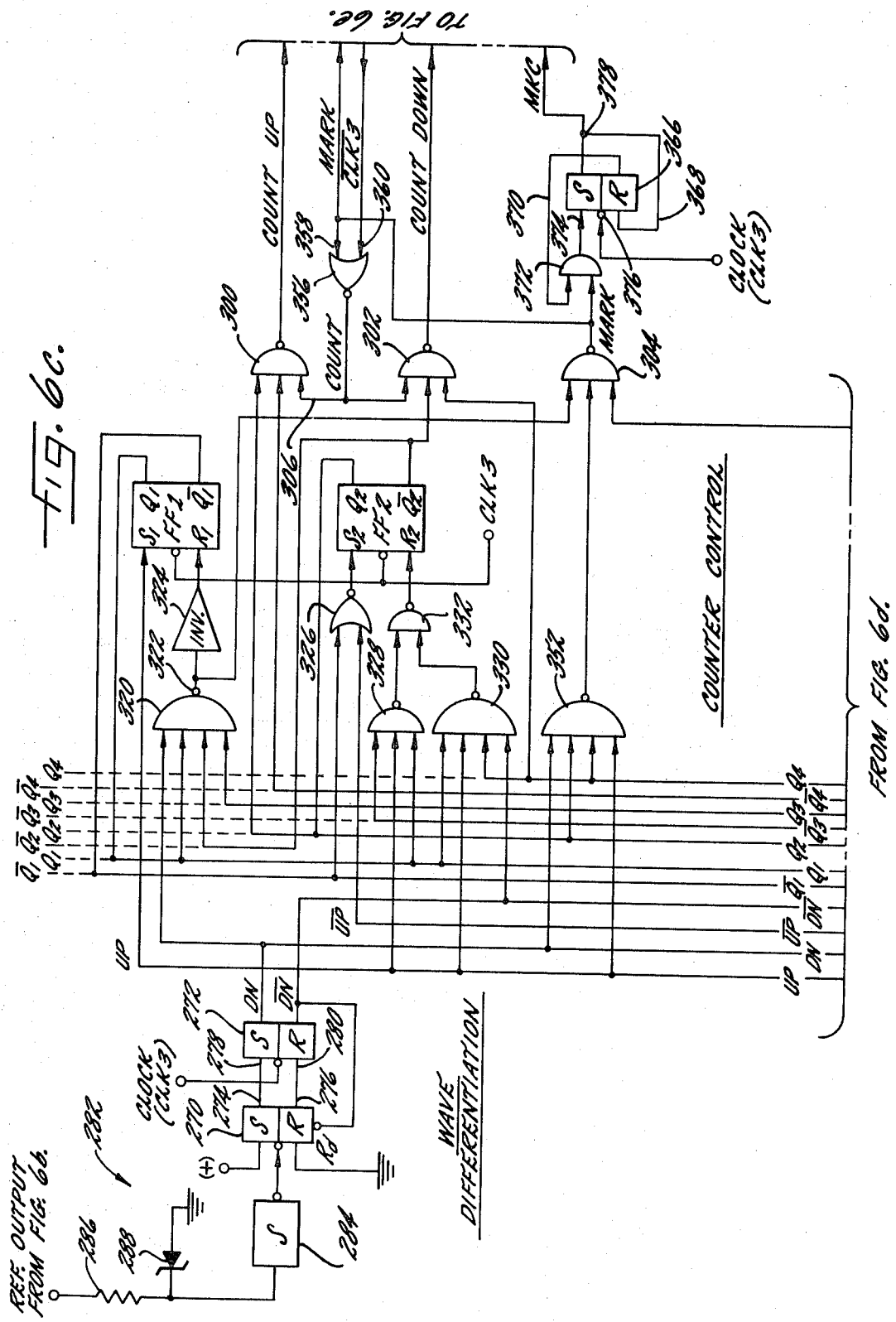

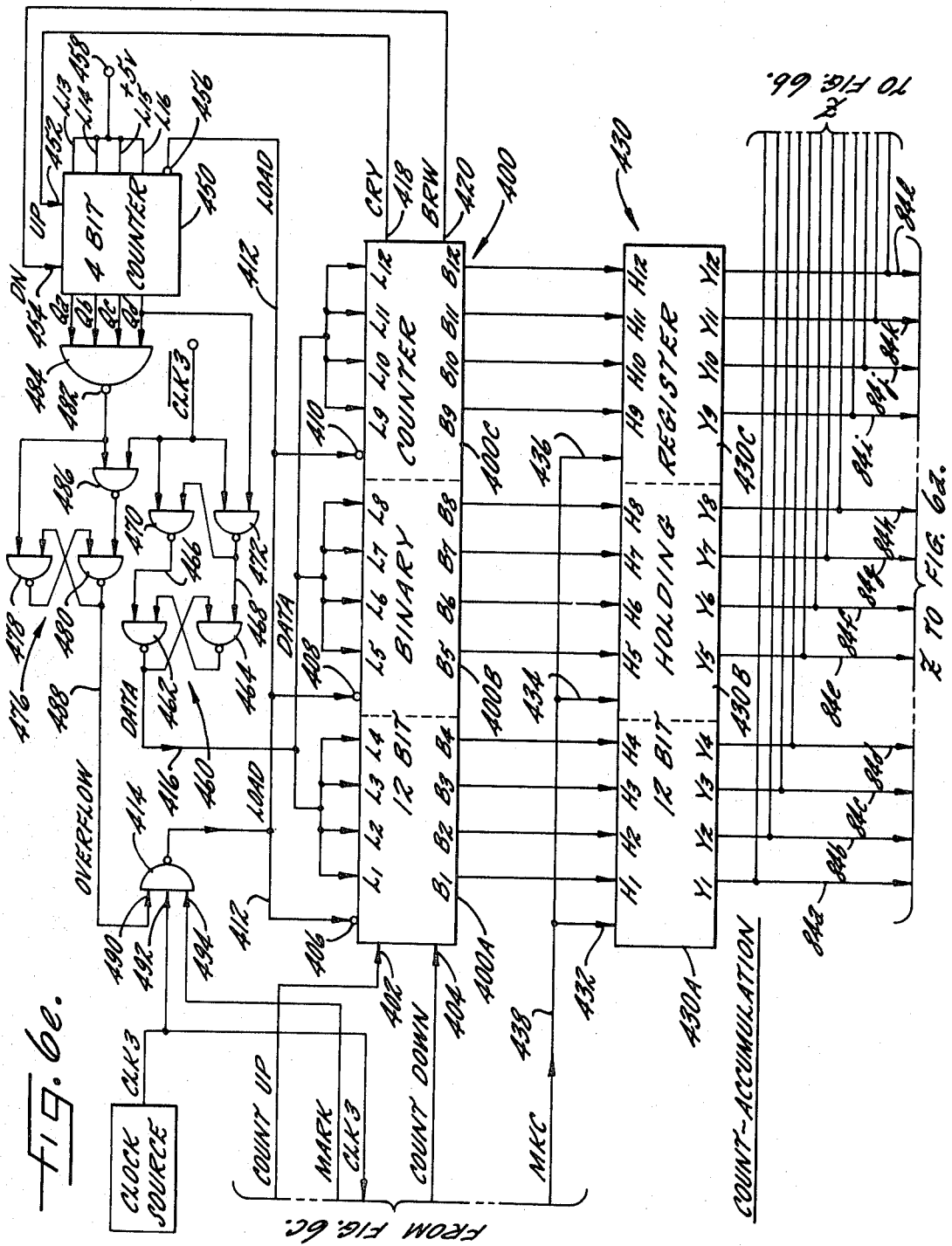

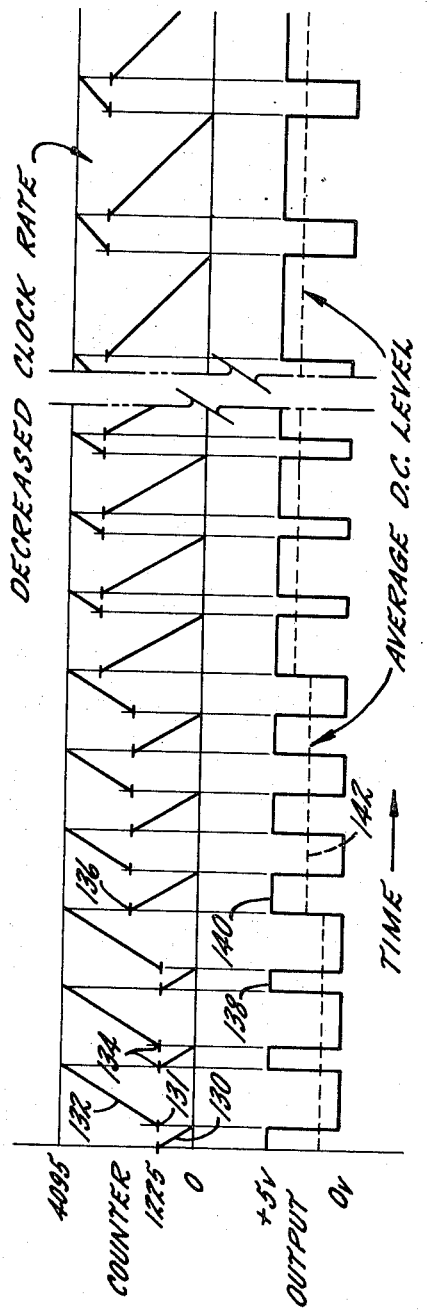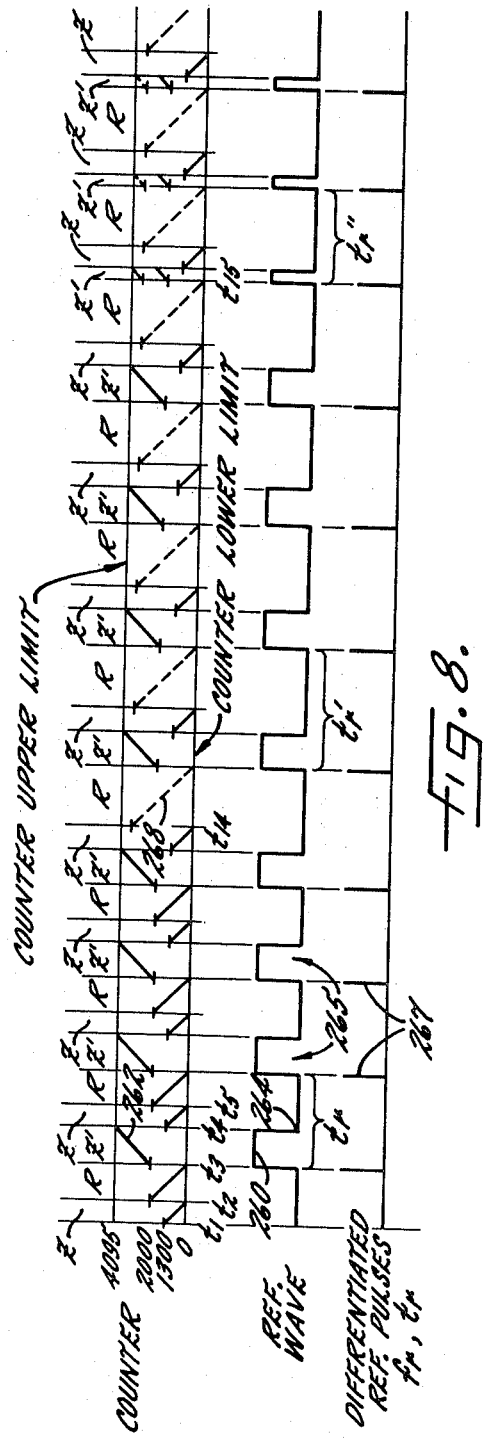

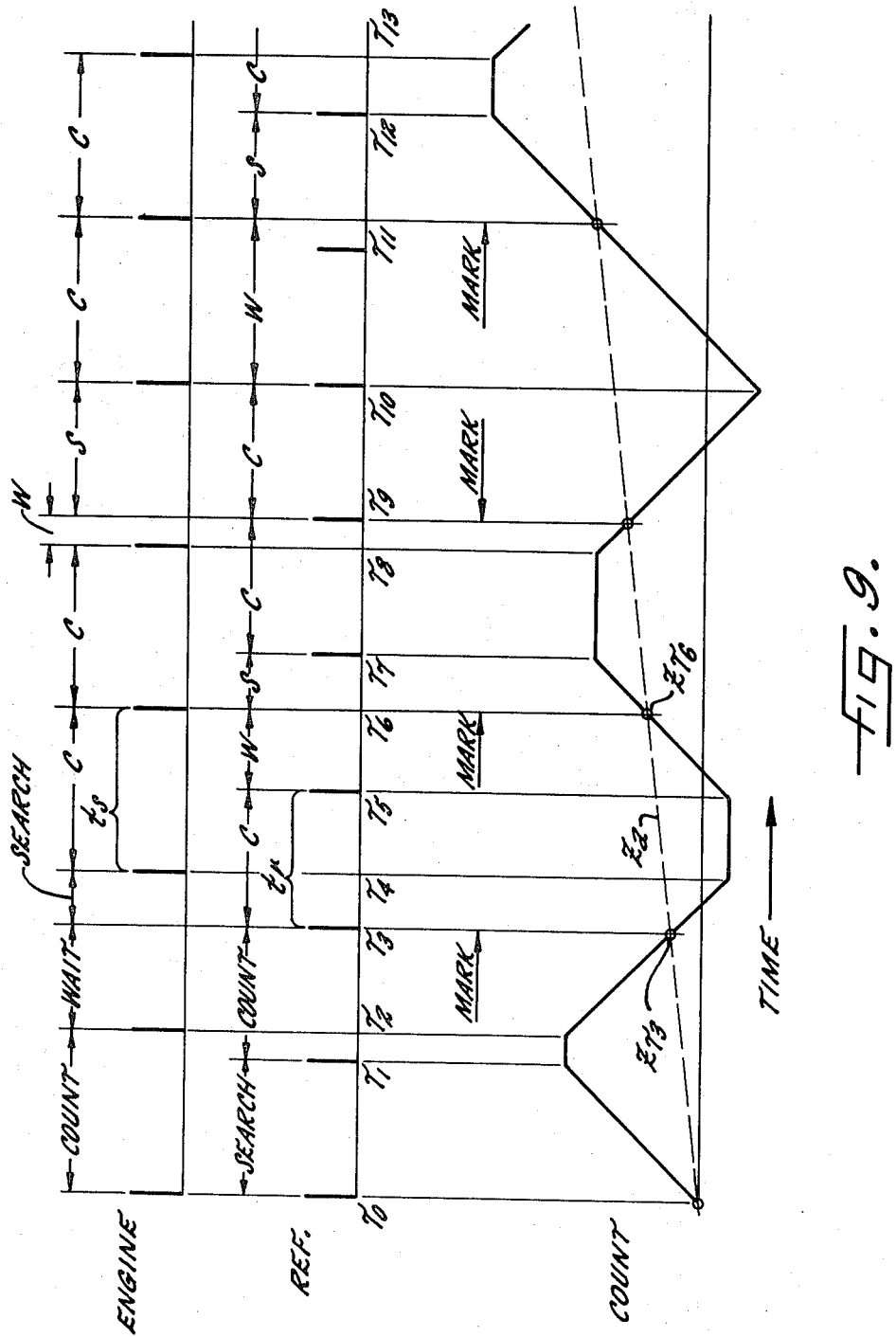

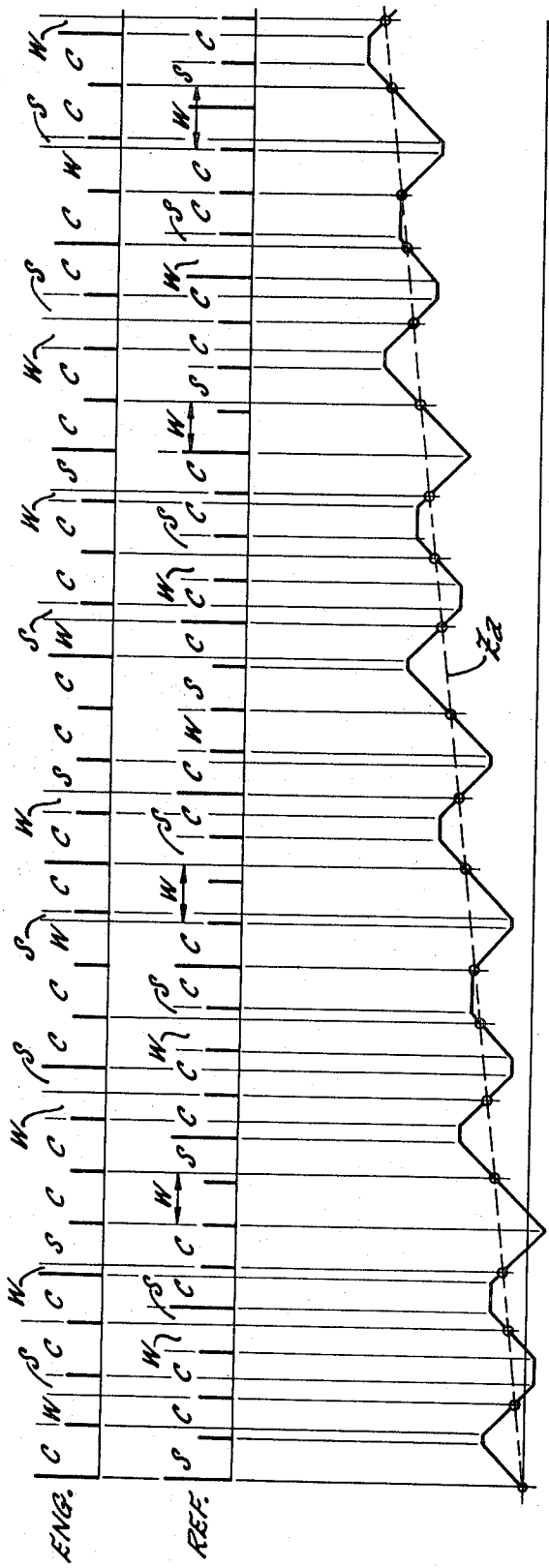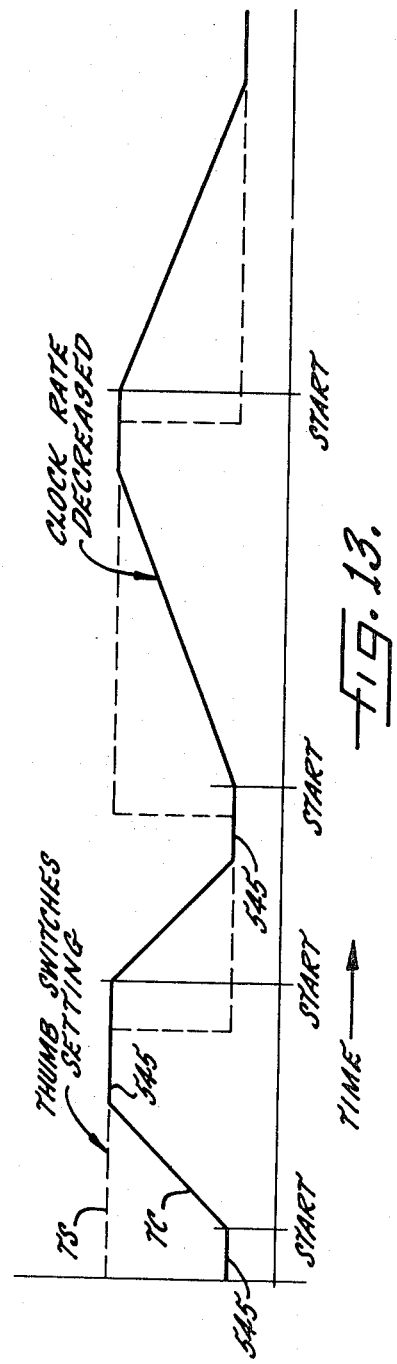

DIGITAL GOVERNOR

This application is a division of a presently pending application of William J. Barrett entitled "Digital Governor" Ser. No. 177,285 filed Sept. 2, 1971.

The present invention relates in general to apparatus for controlling the speed of prime movers and more specifically to electronic speed control governors employing digital techniques.

The primary function of speed governors is to maintain the speed of prime movers essentially constant during variations in the load on the prime mover. Conventional speed governors employ a reference signal representing the desired or "set point" speed. To this signal is compared a signal corresponding to the actual speed of the prime mover, the difference between these signals resulting in a servo correction signal for controlling, through an appropriate actuator, the energy flow to the prime mover to correctively adjust the speed and thereby to reduce deviations between the compared signals to zero. The performance of a typical governor in responding to speed changes to produce a correction signal is measured by the speed of correction or freedom from lag, the stability of control and the immunity from "drift" in operation due to the effects of temperature, aging, and power supply variations on components of the system. The speed governors heretofore available in the art were limited in their capacity for improvement in accordance with the above criteria in that they were inherently analog devices, relying on the stability and accuracy of discrete signal levels at all stages of decision and control within the system. These discrete signals, be they mechanical, electrical or hydraulic signals, were inherently dependent for their reliability on devices subject to the above-mentioned environmental factors.

Accordingly, it is the primary object of the present invention to provide a speed governor for prime movers which is inherently immune to drift in its operating characteristics due to temperature, aging, and power supply variations. It is a related object to provide such a governor which is nonetheless characterized by fast response and excellent stability over wide ranges of load variations on the prime mover.

It is another object of the present invention to provide an electronic governor which is all-digital in design and which relies to only a minimal extent on the stability of discrete components within the system.

There are two basic types of governors, droop governors and isochronous governors. A "droop" governor controls energy flow to the prime mover in a fashion such that as load torque on the prime mover (operating as a single unit) increases, the steady state speed decreases from the no-load set point value. For a given set point, there is a particular steady state speed which obtains for each value of load. Droop governors are employed principally to control prime movers driving alternators connected in parallel and thus subjected to synchronizing torque, at least one governor-prime mover-alternator system being isochronous to maintain the electrical system frequency. By adjusting the set point signal of a droop governor so connected to control a prime mover driving an "on line" alternator, the share of system load provided by that alternator is changed. An isochronous governor, on the other hand, simply controls the rate of energy flow to the prime mover to make actual speed equal to set point speed, and thus to make the steady state speed error substantially zero. Time integral and time derivative signal components may be utilized to reduce transient times and inhibit hunting. As such, an isochronous governor is inherently droop-free.

A further object is the provision of an all-digital design technique and apparatus which is applicable to the various common forms of governor controls, including both droop and isochronous governors, with equal effectiveness and with a minimum of complexity in converting from one form of control to the other.

Still another object of the present invention is the provision of a governor responding to speed variations of a prime mover at a rate and in an amount which is dependent only on speed variations and which is essentially independent of the adjusted value of the nominal steady state set point speed at which the prime mover is being maintained.

Another object is the provision of an all-digital electronic governor characterized by proportional control for an immediate response to load changes and resulting speed errors and integral control for reducing speed errors during prolonged off-speed periods.

It is a further object to provide a governor in which two periodically recurring signals respectively proportional in frequency to the actual speed of the prime mover and the desired set point speed are compared digitally to signal a number proportional to the integral of the difference in their respective periods.

A more specific object is the provision of digital signal comparing apparatus including a counter controlled to repetitively compare two recurring wave trains by counting up and down respectively during non-coincident periods of the respective wave trains, with the attendant advantage that the count in the counter at the end of each comparison operation provides a digital representation of the time integral of the difference in the periods of the respective wave trains. A related object is the provision of such signal comparison apparatus in which the counter capacity is minimized without loss of comparison accuracy by rendering the counter inoperative during the actual overlap of the two periods being compared during any given comparison operation.

An ancillary object of the present invention is the provision of a speed governor in which all internal computations are performed digitally, but which nonetheless is suitable for use with conventional electromechanical actuators. More specifically, it is an object to provide such a governor in which an electrical output signal suitable for driving an analog actuator is provided having an average d.c. content which is proportional to a digitally computed number representing the desired energy flow.

Yet another object of the present invention is the provision of a variable frequency oscillator for producing a speed reference signal having a period corresponding to the algebraic sum of a plurality of binary coded input signals. It is a related and more specific object to provide a variable frequency oscillator in which a binary up-down counter is employed and controlled to consecutively monitor a plurality of input signals and to count in a direction and for a period corresponding respectively to the sense and binary magnitude of each of said input signals, with the advantage that the time interval required for completing the sequence of monitoring each input signal and counting up or down for periods corresponding to the binary magnitude of each signal is linearly related to the algebric sum of the binary numbers representing the values of the respective signals.

Other objects and advantages of the present invention will become apparent upon reading the following description, taken in conjunction with the accompanying drawings in which:

FIG. 4 is a block diagram of a further modification of the governor of FIG. 2.

FIG. 5 is an explanatory diagram showing the manner in which FIGS. 6a-6f may be joined to form a composite, detailed schematic diagram of the governor shown by the generalized blocks in FIGS. 1-4.

FIGS. 6a-6f are detailed schematics of the actual circuits used in the generalized block shown in FIGS. 1-4.

FIGS. 7-13 are timing diagrams illustrating the operational features of the various circuits of FIGS. 6a-6f.

Figure 1:
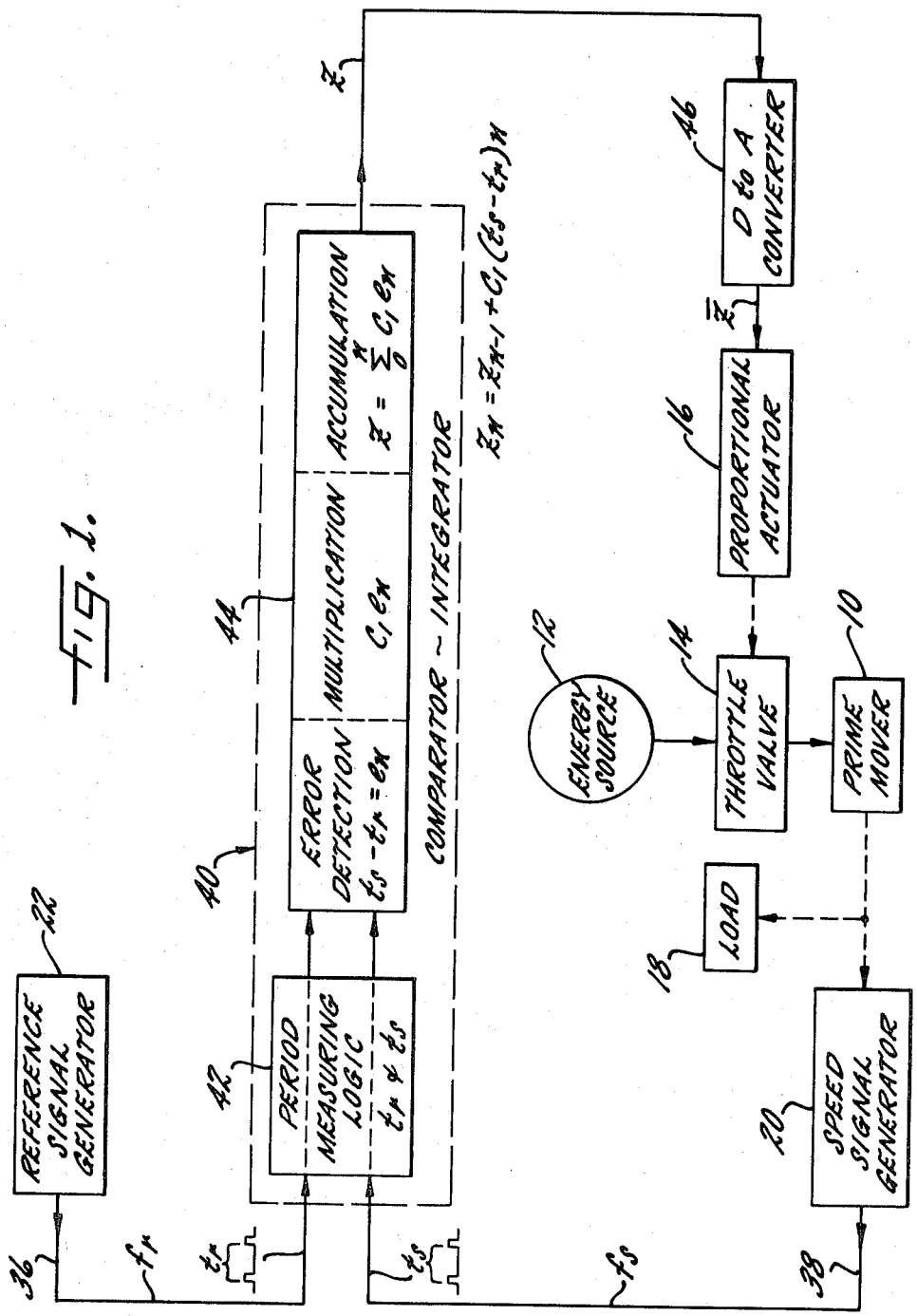
FIG. 1 is a simplified block diagram of an isochronous governor constructed in accordance with the present invention, showing the control equations associated with the various functional elements.

While the invention has been shown and will be described in connection with certain preferred embodiments thereof, there is no intention that the invention is to be limited to the particular embodiments set forth. On the contrary, it is intended to cover the various modifications, alternatives and equivalents falling within the spirit and scope of the invention.

As used herein, the term "signal" is to be taken in a generic sense and is intended to include any electrical manifestation having information content. Thus a signal may be a voltage or current carried by two lines or it may be the parallel combination of binary bits presented simultaneously on a plurality of lines equal to the number of bits. In the former case the "magnitude of the signal" is measured in terms of current, voltage, frequency or period, whereas in the latter case the magnitude of the signal is measured by the binary number represented by the simultaneously occurring logic states on the parallel lines.

The logic elements shown in connection with the following description typically operate between supply voltage levels of 0v. and 5v., and in the description to follow a logic 1 is assumed to be the 5v. level, while a logic 0 is the 0v. level.

In certain drawings digital circuit elements have been symbolically illustrated in the manner commonly used in the electronics art. In view of the widespread usage of certain elements, it is unnecessary to give a detailed description of the combination of components constituting each logic element, and it will be readily appreciated by one skilled in the art that many different variations and combinations of components can be used to perform the logic function assigned to each logic element. However, a brief description of the operation of these common elements will be helpful in understanding the operation of the digital control system of this invention. A flip-flop is a two stage circuit having two stable states. In one state, the first stage conducts and the second stage is cut off. In the other state, the second stage conducts and the first stage is cut off. The flip-flops are illustrated as rectangles having a "set" section S and a reset section R. Input terminals are attached to the left side of the flip-flops, as illustrated in the drawings, and output terminals are attached to the right side thereof. When an input signal or pulse is applied to the input terminal of the S section, the flip-flop is set and the desired output signal, typically a logic 1, is provided at the S output terminal only. When an input signal or pulse is applied to the R input terminal, the flip-flop is "reset" and the desired output signal 1 is provided at the R output terminal only. Naturally, the S and R outputs must always have opposite logic levels. A small circle at the input of a logic element indicates that the element responds to a negative-going or trailing edge of a pulse applied at that input, whereas an uncircled input terminal indicates that the logic element responds to a positive-going or leading edge of a pulse applied at that terminal. A small circle at the output terminal of a logic element indicates that the desired output signal will be negative-going or logic 0, whereas an uncircled output indicates that a desired output signal will be positive-going or logic 1. When an input signal or pulse is shown as applied to a terminal connected to the junction to the S and R sections, the element is intended to represent a "clocked" flip-flop, characterized by the fact that the stable state at the input of the S and R sections will be shifted to the outputs of the S and R sections respectively only upon the occurrence of a clock pulse at the junction terminal. A clocked type flip-flop will act as a binary counter if the R output is connected to the S input and the S output is connected to the R input (commonly known as the J-K configuration). With these cross connections, the flip-flop is set with each even numbered clock pulse at the clock terminal and reset with each odd numbered pulse at the clock terminal. Clocked flip-flops normally have an additional pair of input terminals $S_d$ and $R_d$ for directly setting or resetting the flip-flop without waiting for the occurrence of a clock pulse. In practice, a set flip-flop is said to be in the 1 state, while a reset flip-flop is in the 0 state.

An OR gate as used herein produces a desired output 1 level signal in response to a 1 input signal at any of its input terminals, while an AND gate produces a desired 1 output signal only in response to 1 level input signals at all of its input terminals simultaneously. When the desired output signal is a logic 0, the gates are respectively termed NOR and NAND gates. An inverter (INV) converts a 1 level signal into a 0 level signal and vice versa. Finally, certain logic functions in the embodiments to be described, such as binary counting and multiplexing, may be performed by multi-function logic elements which have been standardized in the digital art and which are available in single-package integrated circuits. While these multi-function circuits are characteristically combinations of simple flip-flops and gates, their operation is better understood by reference to the overall function and input-output characteristics. Thus the detailed description of the internal construction of these elements is incorporated by reference to the manufacturer and his assigned type number for the element.

General Description of the Various Embodiments and their Operation

Turning now to FIG. 1, a functional block diagram illustrates a digital governor constituting an exemplary embodiment of the present invention. A prime mover 10 to be governed is supplied from an energy source 12, the rate of supply being regulated by a throttle valve 14 mechanically controlled by an actuator 16. The prime mover 10 is shown mechanically connected to drive a load 18 while additionally being connected to a speed signal generator or transducer 20.

The prime mover 10 may, for example, be an internal combustion gasoline engine, in which case the energy source 12 would be a gasoline supply having an output conduit controlled by the throttle valve 14. Alternatively, the prime mover 10 may take the form of hydraulic turbine whose load is an electric generator, in which event the energy source 12 may be a source of pressure fluid from a hydraulic pressure head such as the pen stock of a power dam.

The primary purpose of a speed governor is to maintain the speed of the prime mover 10 substantially constant at a selected "set point" speed regardless of variations in the load 18 and the torque it imposes on the prime mover. Where the load is an electric generator, the torque variations will be due to sudden changes in the amount of current drawn from the generator. Similarly, if the prime mover is an engine for driving a vehicle, the load 18 will vary due to changes in the terrain over which the vehicle passes. The conventional speed governor employs a speed reference against which a signal proportional to the actual speed of the prime mover is compared to produce a speed error signal for adjusting the actuator, which in turn adjusts the rate of energy flow to the prime mover to close the control loop.

In conventional governors, either of two basic actuator types may be used, "integrating" or "proportional". A proportional actuator is characterized by the fact that the position of the control throttle is at all times proportional to the magnitude of the signal supplied thereto.

In contrast, an integrating actuator moves the throttle at a velocity depending upon or proportional to the magnitude of the signal supplied thereto and by an amount determined by the time integral of the input signal.

The actuator 16 shown in FIG. 1 of the proportional type, an example of which is shown and fully described in U.S. Pat. No. 3,442,277, issued May 6, 1969 to Bernard B. Barnes and assigned to the assignee of the present invention. Reference may be made to the above-identified patent for a more complete explanation of the advantages of the proportional actuators over integrating actuators.

The speed governor of the present invention departs considerably from the conventional speed governors discussed above, and, as will be more fully explained in the discussion to follow, applicant's governor is readily adaptable for operation as either a droop or non-droop (isochronous) governor, with the further advantage that the proportional-type actuator 16 may be used in either mode of operation.

As illustrated in FIG. 1, the governor of the present invention includes a reference signal generator 22 for producing a signal in the form of a train of pulses having a reference frequency $f_r$ proportional to the desired speed of the prime mover. The reference signal period $t_r$ is thus inversely proportional to the desired speed, bearing in mind the basic and well known relationship that the period t of any recurring event or wave is equal to the reciprocal of the event or wave frequency $f$, i.e., $t = 1/f$. This pulse train, along with a train of pulses from the transducer 20 having a period $t_s$ or spacing inversely proportional to the actual speed of the prime mover, is fed to a comparator-integrator unit 40 which produces a binary encoded servo control signal Z having a numerical magnitude proportional to the time integral of the difference between the respective periods $t_s$ and $t_r$ of the two pulse trains. The servo control signal Z is then fed through a digital-to-analog converter 46 to the proportional actuator 16 which correctively adjusts the throttle 14, and thus the rate of energy flow and the speed of the prime mover 10 so that the difference between the periods $t_s$ and $t_r$ of the respective pulse trains is reduced substantially to zero. The reference frequency may, in different embodiments, represent the instantaneous desired speed or the long term desired set point speed.

Although an exemplary form of the reference signal generator 22 will be later described, for the embodiment of FIG. 1 any of a wide variety of simple pulse generators known to the art may be employed. In one preferred form, the generator 22 will supply a highly stable constant, but manually adjustable, frequency $f_r$ equal to the frequency $f_s$ of the speed pulses when the prime mover is stabilized at the desired set point speed. In an alternative form to be described, the generator 22 may provide a reference frequency $f_r$ which changes quickly in response to variable factors represented by signaled, changeable input numbers.

For the purpose of producing a train of pulses having a period varying with the speed of the prime mover, the speed signal generator 20 is in the form of a speed-to-frequency converter or transducer, having a mechanical input from the prime mover 10 which is effective to produce a train of speed pulses on an output line 38 having a period $t_s$ which varies inversely in accordance with the speed of the prime mover. The speed signal generator 20 may, for example, comprise a toothed or gear wheel mounted for rotation by the prime mover 10 for cutting either a light path to a photosensitive pickup or a flux path of an inductive pickoff in a manner well known in the art. The electrical pulses generated by the photoelectric or inductive pickup constitute the aforementioned train of speed pulses.

The signal comparator-integrator 40 is connected to receive the reference pulses on line 36 and the speed pulses on line 38. The device 40 includes an input logic section 42 for effectively measuring the respective periods $t_r$ and $t_s$ by selectively controlling the counting of high frequency pulses during time segments proportional to $t_r$ and $t_s$ in a manner to be hereinafter described. The period measuring logic supplies an input to an integrating counter-register combination 44 which functions by successive iterations to perform the indicated algebraic functions, wherein $e_n$ represents the instantaneous difference (measured at iteration time interval $n$) of the periods $t_s$ and $t_r$, $C_1$ is a multiplication factor, and the servo correction signal Z is a binary number representing the sum of the accumulated measurements of the time difference between the periods $t_s$ and $t_r$ or, effectively, the time integral of the period difference ($t_s-t_r$). The control signal Z is coupled to the proportional actuator 16 through the digital-to-analog (D to A) converter 46 to close the primary governor servo loop. The analog form of the digital signal Z is here designated $\bar{Z}$ to distinguish the two.

The system thus far described governs the speed in an isochronous manner. A drop in the speed in the prime mover 10 due to an increase in load will produce a period difference $t_s-t_r$ which, through amplification and integration, will increase the control signal Z and the rate of energy flow through the valve 14 to return the prime mover to the desired set point speed. Such a governor will control the engine speed satisfactorily for certain engines in which induction loss is high. For other prime mover configurations, however, an added degree of stability is desirable to prevent hunting or oscillation of the speed error, especially when overall system gain is high.

Figure 2:
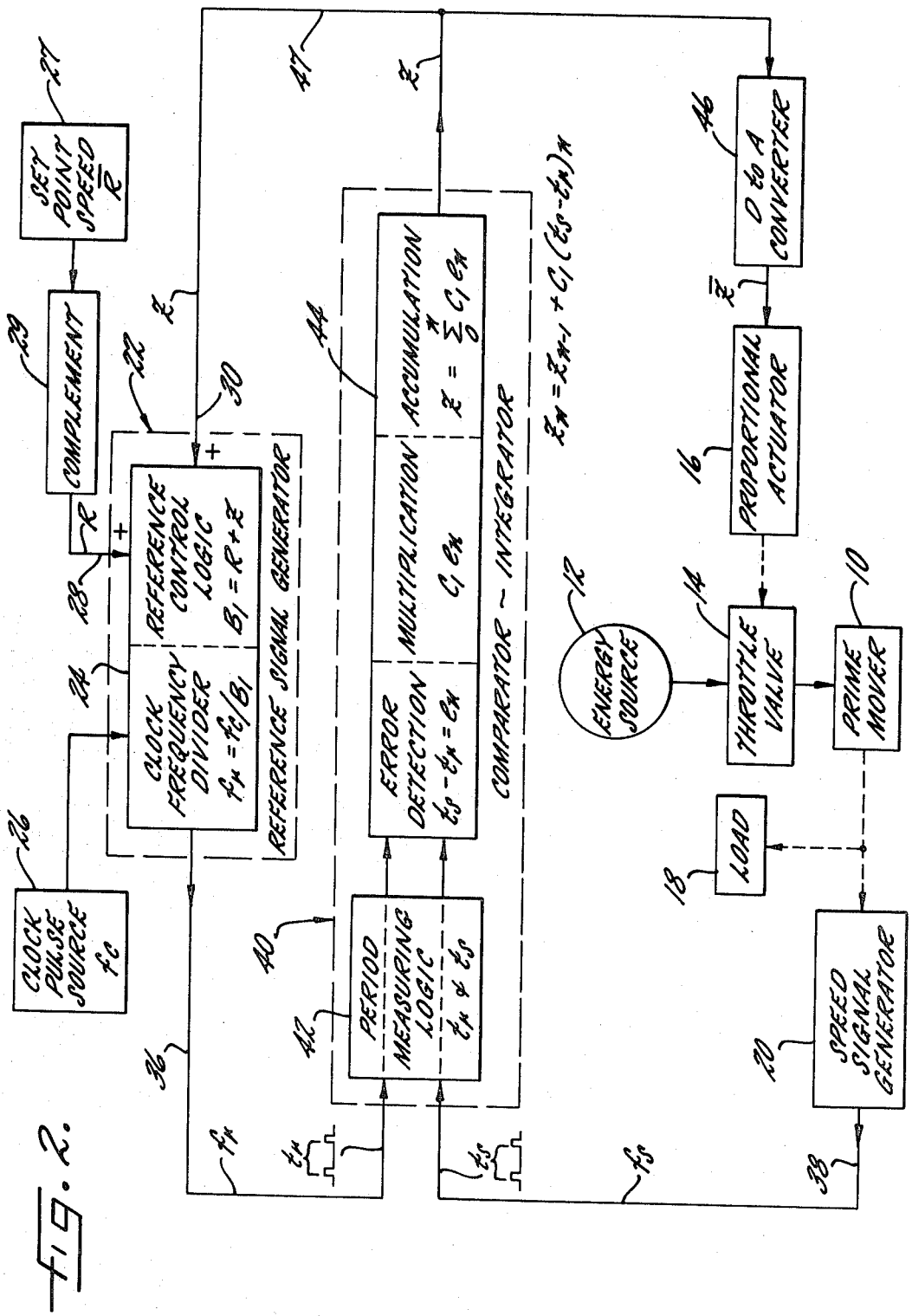
FIG. 2 is a block diagram of a modified version of the governor shown in FIG. 1 which is operational as a droop governor.

The embodiment of the invention shown in FIG. 2 provides this additional degree of stabilization by inclusion of a reference signal generator 22 having operative elements responsive to the servo control signal Z for varying the period $t_r$ of the reference pulses in accordance with variations in the control signal Z. To this end, the reference signal generator 22 is illustrated as being driven by a clock pulse source 26 and providing a frequency division function, $$f_r = f_c/B_1$$

wherein $f_c$ is the constant frequency of the clock source 26, $f_r$ is the frequency of the reference pulse train and $B_1$ is a non-dimensional number representing the algebraic sum of a plurality of binary coded signals provided at inputs 28 and 30 respectively. In the present instance, $$B_1 = R + Z$$

where Z, received at input 30, is the binary coded servo correction number previously described and R, received at input 28, is a set point number which in this instance is a binary 1's complement of a set point number $\bar{R}$ signaled by a series of adjustable digit switches hereinafter described. Since the frequency $f_r$ of the reference pulse train appearing on the output line 36 is inversely proportional to the algebraic summation number $B_1$, an increase in the set point number R will cause a decrease in the frequency $f_r$ and therefore an increase in the period $t_r$. In other words, the period $t_r$ is directly proportional to the manually settable number $\bar{R}$.

At this point, and to avoid momentary confusion, it should be noted that the number R appears as a positive number in the expression $B_1 = R + Z$ labeled in FIG. 2. As will appear more fully below, the set point number R is the 1's complement of a true, conventional set point number $\bar{R}$. The binary 1's complementing device 29 is provided so that the frequency $f_r$ varies in sense with variations in the manual setting of R.

Similarly, as Z increases, the divisor $B_1$ increases and the period $t_r$ of the reference pulses increases. The period $t_r$ thus changes directly in accordance with variations in the control signal Z. If the load 18 is a single unit (and not an alternator connected to an "infinite bus"), the result of the feedback of Z on the path 47 will be to introduce a finite speed error, or droop, to the system, the magnitude of which depends on the load. As the servo control signal Z increases in response to a load increase on the prime mover 10, the period $t_r$ also increases to approach the period $t_s$ and to restore the periods $t_r$ and $t_s$ to a condition of equality with each other. As a result, the period difference $t_s-t_r$ will be quickly reduced before appreciable lags in the governor control loop can introduce serious overshoot in the response.

As an additional feature of the invention, the digital governor system shown in FIG. 2 as a droop type system may be readily expanded, by duplication of the same hardware building blocks and the adjustment of constants, into an isochronous system. Such a conversion has been illustrated in the embodiments shown by FIG. 3 and FIG. 4, the lower portion of each comprising a droop digital governor essentially identical to that shown in FIG. 2. Focusing first on the embodiment of FIG. 3, the upper portion of the drawing shows the functional block diagram of what is, in effect, a second governor acting to control the output frequency $f_r$ of the reference signal generator 22 of the primary governor. Thus the functional blocks of the primary governor already described are duplicated and the reference numbers remain the same as for the identical elements of FIGS. 1 and 2.

Figure 3:
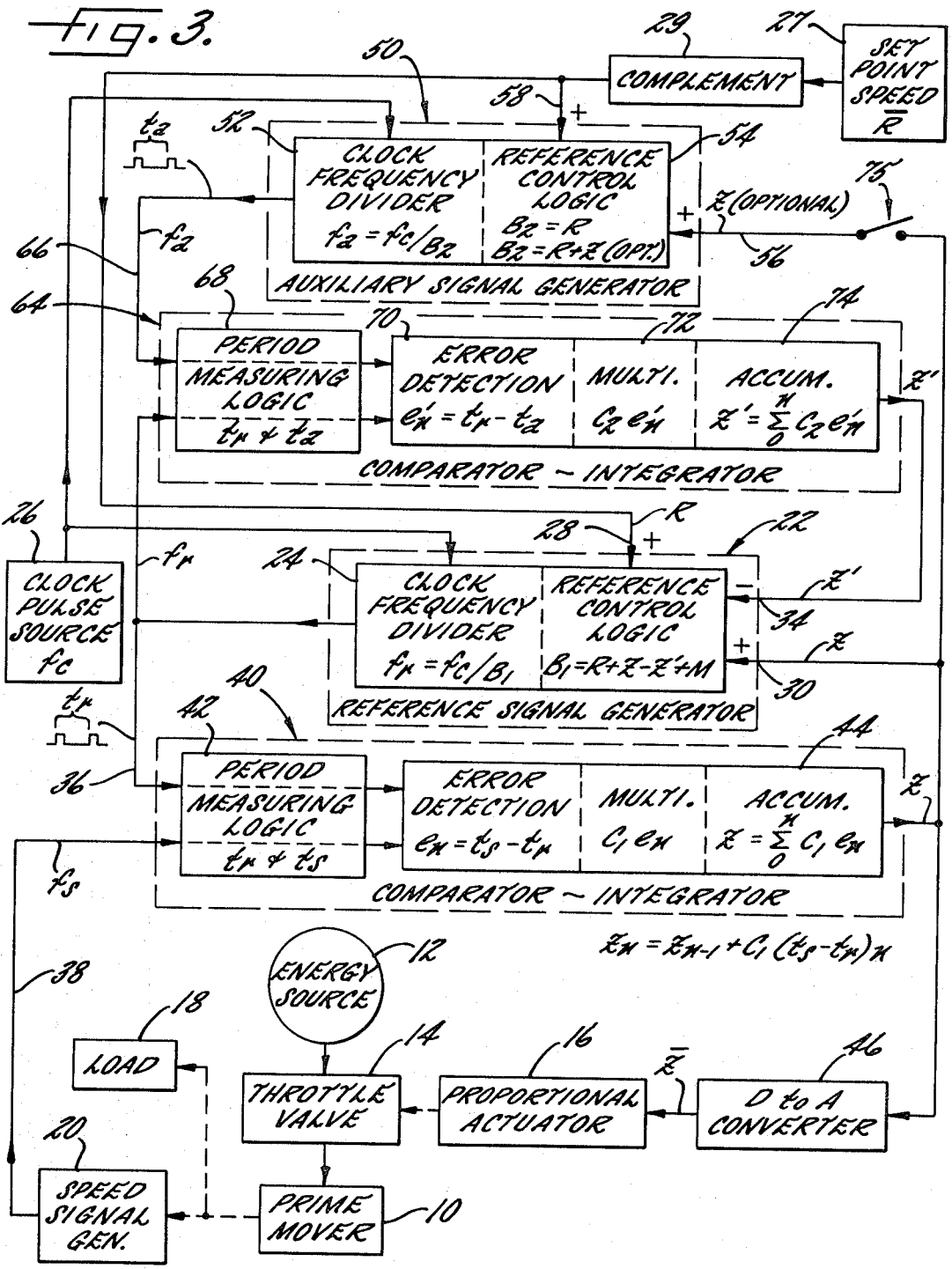
FIG. 3 is a block diagram of a modification of the governor shown in FIG. 2 illustrating the duplication of existing hardware for converting the governor of FIG. 2 into an isochronous governor.

Accordingly, the embodiment of FIG. 3 includes all the elements and produces all the control signals of the embodiment of FIG. 2 but further includes an auxiliary signal generator 50 settable to produce a third train of pulses at a predetermined fixed frequency $f_a$ equal to the frequency which the aforementioned reference and speed pulses will attain under no-load, droop-free conditions of the embodiment of FIG. 2. The period $t_a$ of this third train of pulses provides a standard for and is compared with the period $t_r$ of the reference pulses in a second comparator-integrator 64 which produces a binary coded reference control signal Z' having a numerical magnitude which varies in accordance with the time integral of the difference between the respective periods $t_r$ and $t_a$. The reference control signal Z' is connected to the input 34 of the reference signal generator 22 in opposition to the servo control signal Z. The rate of integration of the second (upper) comparator-integrator 64 is chosen to be much slower than that of the first (lower) comparator-integrator 40 so that the reference control signal Z' will gradually eliminate the effect of the servo control signal Z on the factor $B_1$ and thus on the period $t_r$ of the reference signal. Therefore, the upper portion of the embodiment of FIG. 3 effectively de-droops the droop governor shown in the lower portion, but it does so at a rate which is too slow to interfere with the stabilizing effect provided by the feedback of the servo control signal Z to the reference generator 22. As such, the embodiment of FIG. 3 provides a reset or integral correction over the long term.

The auxiliary generator 50 performs a frequency division function as indicated by the equations labeled in the frequency divider 52 and the reference control logic 54. Inputs 56, 58 are shown to illustrate a capacity for algebraic summation of binary signals in the generator 50, but in isochronous operation (with a switch 75 open, as shown) the only input signal to the control logic 54 is the speed set point number R, the auxiliary signal generator 50 producing an output frequency $f_a = f_c/R$, which remains constant at all times. The second comparator-integrator 64 is connected to receive the reference pulses at a frequency $f_r$ from the primary governor and the auxiliary pulses at a frequency $f_a$ from the auxiliary generator 50 appearing on a line 66. Like the comparator-integrator 40 of the primary governor, the device 64 provides a period measuring logic function, an error detection function, a multiplication or "weighting" function, and an accumulation function as indicated at 68, 70, 72 and 74 respectively. The binary coded reference control signal Z' is fed to the input 34 to the reference control logic of the reference signal generator 22 to effect adjustment of the period $t_r$ of the reference pulses so that the measured time difference between periods $t_r$ and $t_a$ is reduced to zero. Note that the upper system in FIG. 2 (with the switch 75 open) does not feed the correction signal Z' back to the reference signal generator 50; thus the "governing" of the reference frequency $f_r$ is done in an isochronous manner.

In operation, the primary governor of the isochronous system operates in the same manner as the droop system shown in FIG. 2 in providing close-tracking of the rate of energy flow to the prime mover in response to fluctuations in the load 18. An increase or decrease in the servo control signal Z, in addition to adjusting the energy flow, tends to respectively decrease or increase the frequency $f_r$ of the reference pulse train. Any change in the period $t_r$ is not permanent, however, because the period $t_r$ is compared to the desired fixed period $t_a$ (determined by the set point number R) in the upper portion of the isochronous governor. The difference $t_r - t_a$ is integrated in the comparator 64, and the reference control signal Z' changes accordingly. At steady state conditions the reference correction signal Z' and the servo control signal Z are equal and the frequencies of the pulses from both the reference signal generator 22 and the auxiliary signal generator 50 are both equal to $f_c/R$. In other words, when a load is applied to the governed engine, the initial response will be the same as in the droop governing system. As time goes on, the additional isochronous elements detect the off-speed condition and slowly (relative to the droop system response) correct this error to restore the speed to the set point. The slower correction is simply accomplished by making $C_2$ smaller than $C_1$, as described below.

For certain speed control applications it may be desirable to convert the governor of FIG. 3 back into a droop system. One method of doing this lies in the connection of the signal Z back to the auxiliary signal generator 50 by way of the selective switching device 75. By closing this path the algebraic summing capability of the auxiliary signal generator 50 is utilized and the period $t_a$ is made to increase with increasing values of Z. The periods $t_r$ and $t_a$ will be changed at approximately the same rate and in the same algebraic sense, so that the reference control signal Z' will, over a period of time, attain a value of zero.

Like the embodiment of FIG. 3, the governor shown in FIG. 4 incorporates the basic droop digital governor shown in FIG. 2 and further includes the auxiliary signal generator 50 of FIG. 3 for producing a third train of pulses with a frequency of $f_a$ and a period $t_a$ equal to the periods $t_s$ and $t_r$ of the speed and reference pulses when the prime mover is operating at the desired set point speed. The second comparator-integrator 64 is connected to receive the third train of pulses $f_a$ and the speed pulses $f_s$ (in contrast to receiving the reference pulses as in the embodiment of FIG. 3). These pulse trains are compared to produce a reference control signal Z" which varies in accordance with the time integral of the difference $(t_s - t_a)$ between their respective periods, the signal Z" being binary coded and connected to the reference signal generator 22 in opposition to the servo signal Z for gradually eliminating the effect of the signal Z on the period $t_r$ of the reference pulse train. The characteristic of proportional plus integral control is more readily apparent in the embodiment of FIG. 4 than in the embodiment of FIG. 3. In other words, the digital apparatus functions to control speed isochronously at steady state, but with the stabilizing action known in the governor art as "temporary droop" to prevent hunting or instability. The speed setting number R has a parameter (its binary magnitude) corresponding to the desired set point of speed. The feedback connection 47 provides servo position feedback around the comparator-integrator 40 so that the magnitude of the servo-control signal Z in non-transient or equilibrium circumstances is "proportional to departures" in the speed of the prime mover 10 from the desired set point. The upper loop of the embodiment of FIG. 4 again compares the engine speed pulses to the desired set point represented by the number R, but, without position feedback and with a low rate of integration in the comparator-accumulator 64, the signal Z" assumes a magnitude varying with the "time integral of departures" in the speed of the prime mover 10 from the desired set point. The signal Z" is inserted into the lower servo loop in the manner described in connection with FIG. 3 to effect a gradual adjustment of the operating conditions in the main (lower) servo loop and a restoration of the speed of the prime mover to the desired set point. Thus the upper servo loop of FIG. 4 can be viewed as performing a "trimming" function for the droop governor shown in FIG. 1 so as to restore the speed of the prime mover 10 to the desired set point slowly in response to long term changes in the load on the prime mover, thereby making the entire system isochronous.

While the binary coded signals Z, R, Z' and Z" have been represented as being transmitted over a single line in FIGS. 1–4, it should be emphasized that these single-line signal paths are intended to show only the direction of information flow and that the transmission of binary coded signals herein is accomplished through parallel transmission lines, one line for each binary bit.

Detailed Description of the Circuits

Referring to FIG. 5, there is shown the manner in which FIGS. 6a-6f may be joined to form a composite, detailed schematic diagram of the governor shown by the generalized blocks in FIG. 2.

A. Digital to Analog Converter (FIGS. 6a and 7)

The digital-to-analog converter 46 receives the servo control signal Z as a binary coded 12-bit signal from the comparator-integrator 40. The purpose of the converter is to provide an output signal $\bar{Z}$ having a d.c. content proportional to the number Z and suitable for driving conventional electro-mechanical actuators. As shown in FIG. 6a, the apparatus for performing this function is entirely digital and includes a 12-bit synchronous pre-settable binary counter 80 and a count control circuit 81. A low-pass output filter 82 is optional and will be used with governors in which the actuator 16 responds only to "pure" d.c. signals. The filter 82 removes the a.c. component. The counter 80 is selectively loaded or set in a parallel fashion to the binary number Z appearing on a series of input lines 84a–84l. A signal (logic 0) appearing on a load control line 86 driven by a NAND gate 88 determines when the input signal Z on the lines 84a–84l will be allowed to set the counter. The counter 80 additionally has an input 90 for receiving a count-up command, an input 92 for receiving a count-down command, an output 94 giving a "carry" (CRY) indication and an output 96 giving a "borrow" (BRW) indication. The count-up and count-down inputs are somewhat self-explanatory; a pulse at input 90 or 92 commands the counter to count to the next highest or next lowest binary number respectively from the number at which it was previously set. The CRY output 94 is normally 1 at all times except when a 1 appears in each stage of the counter 80 (the maximum count) and the next count-up pulse is about to occur. Similarly the BRW output 96 is normally 1 at all times except when a 0 appears in each stage of the counter 80 (the minimum count) and the next count-down pulse is about to occur. While the counter 80 can actually be viewed as having 12 identical flip-flops and the associated up-down gating conventional in the counter design art, the counter is broken into three separate four-bit sections 98, 100, 102 to illustrate that in practice three separate four-bit binary counters are connected in series to give the same effect as a 12-bit counter. The four-bit synchronous up-down counters used may be of the type SN 74193N manufactured by Texas Instruments Incorporated. These counters are connected together for operation as a single counter by coupling the CRY and BRW outputs from each four-bit counter respectively to the count-up and count-down command inputs of the next four-bit counter. In addition to the four flip-flops effectively contained in each four-bit counter, there is included (but not here shown) the necessary gating for allowing the parallel input lines, 84a–d for example, to be controlled by the load command signal on line 86. Also, numerous gates are employed to implement the up-down count function and carry-borrow function as more fully explained in Texas Instruments Catalog Supplement CC301. The counter 80 counts at a rate determined by the frequency of a source 104 of clock pulses (CLK1) selectively gated to the command inputs 90 and 92 through either one of a pair of NAND gates 106 and 108. Whether the clock 104 commands up or down counting is determined by a direction controlling the flip-flop 110 having its S output 112 connected to one input of the NAND gate 106 and its R output 114 connected to one input of the NAND gate 108. The flip-flop 110 is in the familiar J-K configuration, in which the logic levels at the S and R outputs 112, 114 alternate in response to successive clock pulses at an input terminal 116. The CRY and BRW outputs 94, 96 from the counter 80 are connected to the input terminals of a NAND gate 120, the output 122 of which effectively gates the pulses CLK1 from the clock source 104 through a NAND gate 124 to drive the clock input 116 of the flip-flop 110. The output of the clock source 102 is applied, with the output of the gate 120, to the NAND gate 88 to control the loading of the counter 80 with the current value of the number Z. The R output terminal 114 from the flip-flop 110 provides an output on a line 115 for direct connection to the actuator 16, or alternatively, provides an input to the low pass filter 82 which may be an RC averaging circuit and which, in turn, provides a d.c. output proportional to the width of the pulses fed thereto, this output being connected to control the electromechanical actuator 16 as shown in the embodiments of FIGS. 1–4.

The operation of this digital-to-analog converter is illustrated in FIG. 7, which shows counter state variations with time, the variable width pulses on line 114 and the converter d.c. output plotted on the same time base. It should first be noted that the frequency of the clock pulses CLK1 is very high, typically 5 MHz (although it is not critical). With a 5 MHz clock the 12-bit counter (capacity of 4,096 counts) can go through complete counting cycles at a frequency of approximately 1.2 KHZ.

Assume an initial condition in which the number Z loaded into the counter is the binary number 010011001001 representing 1,225 in the decimal system, and assume that the flip-flop 110 is in a reset state so that the NAND gate 108 is enabled. Clock pulses from the source 104 will be gated through NAND gate 108 to the count-down input 92 to drive the counter 80. As shown at 130 in FIG. 7, the instantaneous value of the count will decrease to zero (all 0's in the counter). Before the next clock pulse can change the count, the BRW output 96 goes low, causing the output 122 from the NAND gate 120 to go high. The high signal from the output 122 enables the CLK1 signal to pass through the NAND gate 88, thereby resetting the counter 80 with the number Z as indicated at 131 in FIG. 7. The signal from the output 122 permits the next CLK1 pulse to pass through the NAND gate 124 to toggle the flip-flop 110 to its set state, in which the gate 108 is disabled and the gate 106 is enabled. Succeeding clock pulses now pass through the gate 106 to the count-up input 90 of the counter 80 and the count state increases as shown at 132 in FIG. 7. The counter counts up to its maximum (all 1's), at which time the CRY output 94 goes low, driving the output 122 from the NAND gate 120 high again. The output 122 enables the next CLK1 pulse to pass through the gate 88 to drive the load command line 86 to again insert the number Z into the counter, and additionally the output 122 is combined with the pulses CLK1 in the gate 124 to toggle the flip-flop 110 to its reset state. As shown at 134, the counter counts down to begin the cycle all over again. A change in value of the number Z changes the number from which the counter counts up and down as shown at 136 of FIG. 7. Since the clock frequency remains the same, the sum of the times required for the counter to count down to zero from the number Z and to count up from the number Z to a full count does not change as the number Z varies. Thus the frequency at which the flip-flop 110 is reset remains the same when the number Z varies. However, the width of the pulses 138, 140 taken from the reset output 114 of the flip-flop 110 changes, and the d.c. content 142 of these pulses changes according to the variations in the input number Z. As a result, the magnitude of the d.c. output signal from the converter is directly proportional to the binary number Z.

One of the primary features of this converter lies in its insensitivity to changes in the clock frequency, as illustrated in the right hand portion of FIG. 7. The decreased clock rate lenghtens the time during which the counter must count to reach its limit, but the relative duration of the up and down count periods, and hence the d.c. level of the output, is not affected. That is, the "duty cycle" of the square wave at terminal 114 is unaffected by the changes in the frequency of pulses CLK1, even though the frequency of the square wave may vary.

B. Reference Signal Generator (FIGS. 6b and 8)

Figure 6B:
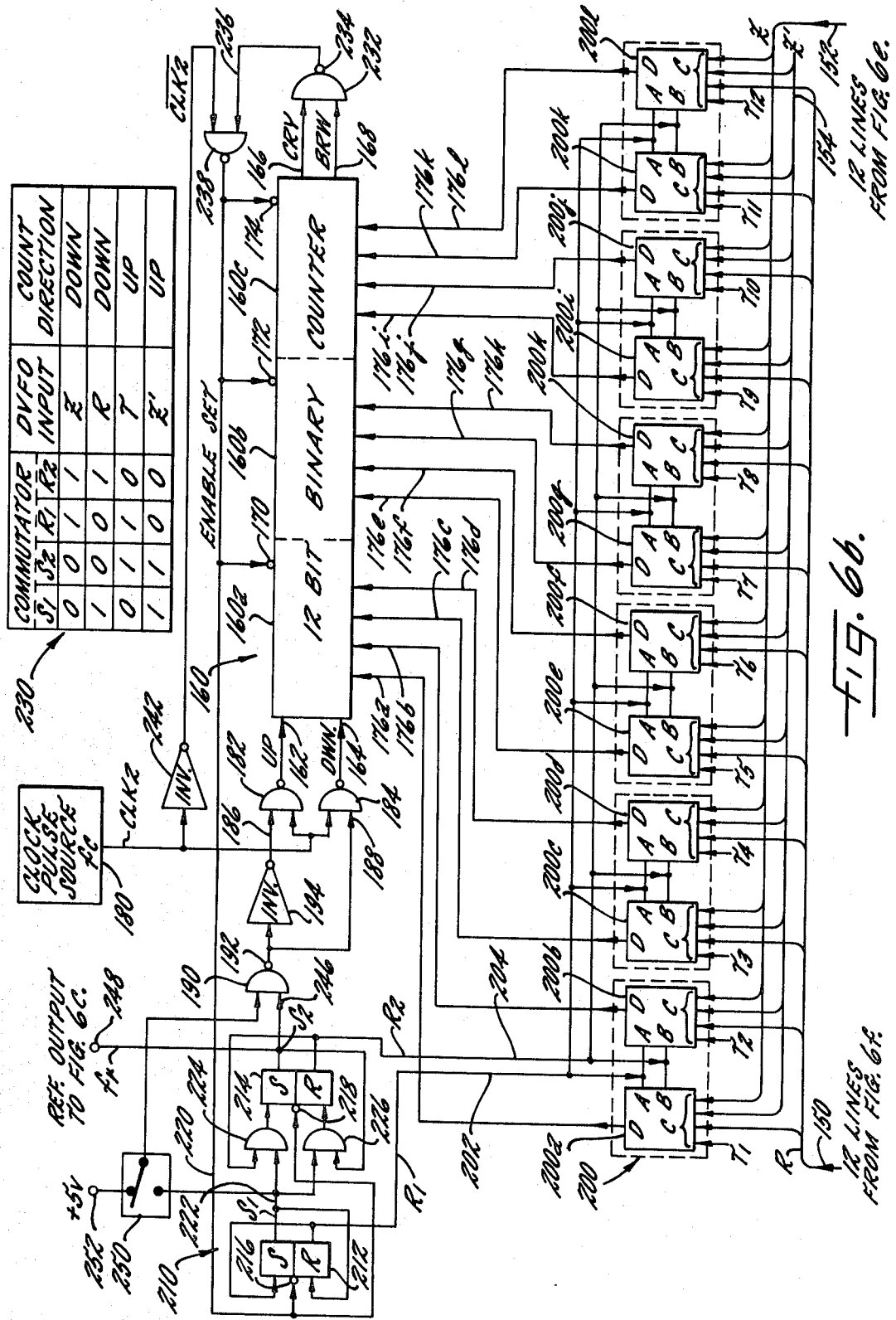

The reference signal generator 22 shown in block form in FIGS. 2–4 appears in schematic form in FIG. 6b and has the operating characteristics shown in FIG. 8.

This generator is, in effect, a digital variable frequency oscillator. In the arrangement shown in FIG. 2, it algebraically sums binary numbers R and Z representing the set point speed and servo position respectively. Then it divides a stable clock frequency $f_c$ by the computed algebraic sum $B_1 = R + Z$ to generate the reference signal $f_r$. In actuality, these two functions are performed simultaneously and by the same apparatus. As shown in FIG. 6b, the digital variable frequency oscillator (DVFO) is connected to receive a plurality of binary coded input signals R, Z, Z' on 12-wire harnesses 150, 152 and 154 respectively. The number of wires used in each harness will correspond to the number of bits in the binary number represented by the input signals, which in the present instance is 12. A multistage synchronous up-down counter 160 having first and second count-direction control terminals 162, 164 is provided and forms the heart of the DVFO system. The counter 160 is identical to the counter 80 described above in connection with the digital-to-analog converter and includes a carry output 166 CRY, a borrow output 168 BRW, set-enabling inputs 170, 172, 174 and a plurality of bit input lines, 176a–176l, one for each stage of the counter, for presetting the counter to a predetermined binary number in response to a set-enabling pulse. Again, the 12-bit counter is shown divided into three sections 160a, 160b, 160c since, in actual practice, it consists of three four-bit counters connected in tandem, each typically being type SN74193 manufactured by Texas Instruments and more specifically described in TI Catalog Supplement CC301 dated 15 March 1970. For selectively driving the counter up or down there is provided a source 180 of clock pulses CLK2 at a stable high frequency $f_c$ selectively coupled to the up-command input 162 or down-command input 164 via one or the other of a pair of direction controlling NAND gates 182, 184. Inputs 186, 188 to the gates 182, 184 are controlled by a single NAND gate 190 having an output 192 which will be 0 during counting up and 1 during counting down. An inverter 194 inverts the state of the output 192 for application to the control terminal 186 of the gate 182.

For selectively conveying the binary informaton in the inputs R, Z and Z' to the load lines 176a–176i of the counter 160, there is provided a gating arrangement indicated generally at 200. The gating is accomplished by a series of multiplexers 200a–200l, each having a controlled terminal D connected to a respective one of the load lines 176a–176l to the counter 160, a plurality of input terminals C for receiving one digit from each of the binary coded input signals to the DVFO and control terminals A and B for receiving a binary coded control signal. The multiplexers are simple commutating logic devices typically of type SN74153 manufactured by Texas Instruments and described more fully in the catalog CC301 cited above. They are shown grouped together in two's to illustrate the fact that they are so grouped together by the manufacturer in a single integrated circuit. In the embodiment shown in FIG. 2, only inputs R and Z are applied to the multiplexers, and it will be readily understood that in such an instance only two inputs for loading the binary counter need be controlled, which could be facilitated by replacing the multiplexers 200a–200l with gates acting as simple single pole-double throw switches. However, the isochronous governor of FIG. 3 has three inputs R, Z and Z' algebraically combined in the reference signal generator or DVFO, in which case the multiplexer arrangement of FIG. 6b becomes desirable. A fourth unused input T1–T12 to the multiplexer units may be used, for example, as a manual speed trim number if desired, but, as shown, it is left disconnected. The control inputs A and B to each multiplexer are connected to common control lines 202, 204, respectively. Each of the input lines C to a given multiplexer has a binary two-bit address associated therewith, and application of that binary address to the control terminals A, B gates the proper one of the inputs C to the controlled terminal D. Since all A and B control terminals receive a common binary command, all 12 multiplex units will pass their respective digits of the DVFO input number, Z for example, to the counter at the same time.

For sequentially applying the DVFO input signals to set the counter 160, there is provided a commutating device 210 comprised of two flip-flops 212, 214 connected to form a two-bit synchronous counter. Each flip-flop is in the J-K configuration and has a clock terminal 216, and 218 respectively, tied to a commutator drive line 220. A connection 222 from the S output terminal of the flip-flop 212 is applied to a pair of AND gates 224–226 to inhibit the criss-crossing feedback around the flip-flop 214 whenever the S output from the flip-flop 212 is low, thereby preventing the clock pulse at the terminal 218 from effecting a change of state of the flip-flop 214. The count sequence for the reset outputs $R_1$ and $R_2$ and their effect on the multiplexers 200 is shown in the truth table 230. The sequence is repeated with every fourth pulse on the line 220, and the multiplexers sequentially apply the respective DVFO input signals R, Z', Z to set the counter 160. For driving the commutator 210 and for properly loading the counter, a NAND gate 232 receives the carry (CRY) and borrow (BRW) outputs 166, 168 from the counter 160. An output terminal 234 from the NAND gate 232 drives a control input 236 of a second NAND gate 238 to enable the complement $\overline{CLK2}$ of the clock input signal CLK2 to pass to the set-enabling inputs 170, 172, 174 of the counter. Additionally, the output from the NAND gate 238 is applied to the commutator drive line 220. An invertor 242 performs the inversion of the clock signal CLK2 to supply $\overline{CLK2}$ pulses to the gate 238. A line 246 connects the S output of the flip-flop 214 to one input of the NAND gate 190 and additionally provides a connection to a main output terminal 248 for the DVFO. The other input terminal to the NAND gate 190 is normally connected through a single pole-double throw switch 250 to a positive voltage source 252. Alternatively, the switch 250 may connect the second input of the NAND gate 190 to the S output of the flip-flop 212 to reverse the sense or polarity of the number T (connected to terminals T1–T12 of the multiplexer) in the algebraic summing function. With the switch 250 in the position shown, the counter 160 will be commanded to count up during $R_1$ and $R_2$ states 00 and 10 of the commutator and to count down during states 11 and 01. In this manner, the sign of the inputs to the DVFO is taken into account. For instance, if the R and Z inputs have positive signs in the algebraic summation to be performed, their index number (on lines $R_1$ and $R_2$) will be chosen as 01 and 11 (the count-down numbers in the truth table 230) so that the counter 160 will count down from the respective numbers R and Z. In the embodiment of FIG. 3, the number Z' has a negative sign in the algebraic summation and will be assigned an input to the multiplexer corresponding to the binary control number 00 or 10 (for the outputs R1, R2) of the truth table 230. When these later control numbers exist, the gate 190 makes the counter count up. If the T input to the counter is used, it can be added positively or negatively by having the switch 250 in its lower or upper position respectively.

FIG. 8 illustrates the operation of the DVFO using three inputs R, Z, Z'. FIG. 8 shows the count in the counter 160, the reference or final output at terminal 248 and the leading edges of the reference pulses (used as the signal $f_r$ in the governor) plotted against a common time base. Basically, algebraic summation is accomplished by having the counter count up or down, depending upon the sign of the input, from an input number which changes in a sequential fashion whenever the upper or lower limits of the counter are reached. For example, assume the numbers Z, R and Z' are binary equivalents of 1,300; 2,000 and 2,000 respectively, and that the signs are +, + and − respectively (as they would be in the isochronous governor of FIG. 3). Assume further that the binary addresses of the inputs R, Z and Z' are the commutator outputs shown in the table 230 and that at the instant $t_1$ the number Z has been loaded into the counter as a result of the occurrence of the binary number 11 on the lines $R_1$ and $R_2$. The reference output 248 is necessarily low and the output 192 from the gate 190 is high, causing the clock source 180 to be gated to the down-command input 164 of the counter 160. Beginning at instant $t_1$, (FIG. 8) the counter counts down at a rate determined by the frequency of the clock signal CLK2. When the counter reaches its lower limit (all 0's) at instant $t_2$, the BRW output 168 goes low, driving the output 234 from the NAND gate 232 high to gate the inverter clock pulses $\overline{CLK2}$ from the inverter 242 through the NAND gate 238. A negative-going pulse thus occurs on line 220 to step the commutator 210 to its next state to make the binary control signal 01 on lines $R_1$, $R_2$. The number R is now gated through the multiplexer 200 to the input lines 176a–176l of the counter 160. Shortly thereafter, a pulse (logic 0) occurs at the load command inputs 170, 172 and 174, and the counter is set to the input number R. It will be appreciated that the actual peripheral circuits and gates used by one skilled in the art for controlling the counter 160, the multiplexer 200 and the commuator 210 may vary to accommodate the characteristics of the particular digital components chosen for the counter 160 and multiplexer 200. Any timing problem which might be encountered in the sequence of (a) advancing the commutator 210 to change its $R_1$, $R_2$ outputs so as to switch from Z to R the number transmitted through the multiplexer 200, and (b) then presetting that new number R into the counter before the next CLK2 pulse arrives, may be obviated by expedients familiar to those skilled in the art. For example, if the counter should tend to reset to the original number Z before the number R is signaled on lines 176a–l, suitable time delay circuits (not shown) may be interposed between the output of the gate 238 and the "enable set" terminals 170, 172, 174.

The counter 160 now begins to count down from the binary number R (2,000) until it reaches its lower limit at the instant $t_3$. Again the BRW output 168 goes low and creates a pulse on line 220 to step the commutator it its next state ($R_1,R_2 = 10$) thereby commanding the counter 160 to load a new number.

In the exemplary illustration of FIG. 8, the T input to the DVFO is assumed not to be in use, and the number T is neglected by tying all of the T input terminals T1–T12 (FIG. 6b) to a binary logic 1 voltage so all bits of the T number are 1's. Accordingly, when the $R_1,R_2$ control signal 10 appears, the counter 160 is set to a full count and it is enabled to count up because the $S_2$ signal is high. The very next pulse from the clock source 180 causes the CRY output 166 to be activated, producing another pulse on the line 220 which immediately advances the commutator 210 to the next $R_1,R_2$ state, i.e., 00. In effect the $R_1,R_2$ signal state of 10 is skipped.

When the $R_1,R_2$ signals become 00 the multiplexer 200 inserts the number Z' into the counter. Moreover, the $S_2$ signal is high, so the output of the gate 190 is low and the CLK2 signals may pass through the gate 182 to the UP input 162 of the counter 160. Thus, beginning substantially at the instant $T_3$, the counter begins to count up until it reaches its upper limit or full count at time instant $t_4$. The CRY output at 166 goes low and thus another pulse appears on line 220 to advance the commutator to the $R_1, R_2$ state 11. This causes the multiplexer 200 to preset the counter again with the number Z at instant $t_4$ and the counter begins counting down toward zero. Thus one full commutation cycle has been completed between instants $t_1$ and $t_4$, and such cycles continuously repeat.

The REF wave 265 (FIG. 8) is taken from the commutator $S_2$ terminal (FIG. 6b) and has high values only when the counter 212, 214 makes the $R_1$, $R_2$ signal a 00 or 10. Thus, the durations of the low and high values of the REF pulses are respectively a proportional to the sum of the positive sign input numbers and b inversely related to the sum of the negative sign input numbers because the larger such numbers become, the shorter are the counting up periods. In the latter relationship (and as shown by FIG. 8), the counting up interval determined by the negative sense input number Z' is proportional to (M−Z'), where M is the full count (here decimally 4,095) capacity of the counter 160. Thus the period $t_r$ of the REF wave is $$t_r = (Z/f_c) + (R/f_c) + [(M-Z')/f_c]$$

where $f_c$ is the CLK2 frequency. The period $t_r$ thus increases as positive input numbers such as Z and R increase, and it decreases as negative input numbers such as Z' increase. The constant M is, in effect, a bias which determines the sensitivity or resolution of the period $t_r$ to changes of a given magnitude in any of the input numbers. The equation for the divisor $B_1$ in FIG. 3 is $$B_1 = R + Z - Z' + M$$

and the output period and frequency from the reference signal generator 22 may be expressed:

$$t_r = (R + Z - Z' + M)/f_c$$

$$f_r = f_c/B_1 = f_c/(R + Z - Z' + M)$$

From the foregoing, it may be seen that any negative input number, such as the number T mentioned in connection with FIG. 6b, may be rendered ineffective or removed by setting that number equal to M, so that the quantity (M−T) becomes zero and need not appear in the foregoing expressions. To remove any positive sign number, the latter is made equal to zero, so that its down counting periods are essentially of zero duration, i.e., endure for only one CLK2 pulse.

The effect of changes in the input numbers R and Z' on the reference period $T_r$ is shown in FIG. 8. At the instant $t_{14}$ an increase occurs in the number R (a positive sense number) as indicated by the broken line 268. The result is a corresponding increase in the period $t_r$, to the value $t_4'$. At the instant $t_{15}$, the negative-sense number Z' increases. The result is a corresponding decrease in the period $t_r$, as reflected in $t_r''$. It is seen, therefore, that the period $t_r$ varies linearly (and the frequency $f_r$ varies inversely) with the algebraic sum of the inputs R, Z and Z' to the DVFO.

As noted above, the set point number R is treated actually as a positive number in FIGS. 2, 3, 4 and 6b. Yet, due to the nature of the device for signaling the number R, the settable actual set point number $\overline{R}$ is the 1's complement of the number R, the complement $\overline{R}$ having been chosen as the manually settable value so that the reference frequency $f_r$, and therefore the speed, varies in the same sense as does the manually settable number. When a higher set point speed is desired and the number $\overline{R}$ is increased, the number R is decreased. An increase in set point speed $\overline{R}$ thus makes (at least momentarily) the period $t_r$ decrease and the frequency $f_r$ increase. This is an excellent example of the versatility of the algebraic summing DVFO and illustrates that any input number may be handled with a positive sign or a negative sign.

It will be appreciated that numerous changes may be made in the apparatus shown in FIG. 6b without changing the basic character of the digital variable frequency oscillator. For instance, the number of inputs can be decreased or increased by respectivly decreasing or increasing the capacity of the multiplexer 200 and the commutator 210. The speed at which the frequency and period of the reference signal $f_r$ changes in response to changes in any of the binary input numbers is directly related to the frequency $f_c$ of the clock signal CLK2 and is limited only by the upper limit of the frequencies at which the counter and other logic elements can operate. But the actual frequency $f_r$ and the period $t_r$ depend essentially upon only the instantaneous absolute value of the algebraic sum of the signed changing input numbers such as R, Z and Z'.

C. Comparator-Integrator (FIGS. 6c, 6d, 6e, 9, 10 and 11)

The comparator-integrator 40 compares the period $t_s$ of the speed pulses to the period $t_r$ of the reference pulses, integrates the difference $t_s-t_r$ between these periods and generates a dynamically changing number Z digitally representing the magnitude of the integrated difference between the respective periods $t_s$ and $t_r$. These functions are accomplished through provision of an up-down binary counter, a digital holding register for selectively sampling and holding the counter contents and a logic circuit operatively associated with and controlling both the counter and the register. The logic circuit iteratively compares by subtraction a first period $t_s$ of the speed pulse train to a second period $t_r$ of the reference pulse train, which second period timingly may overlap the first period, by allowing the counter to count up and down respectively for intervals which in effect correspond to the respective periods. At the end of each comparison operation the contents of the digital register is updated with the new number in the counter and a new comparison operation begins with the counter in its newly established state. The holding register contents are continuously monitored to provide the servo control signal Z, which is a binary representation of the magnitude of the time integral of the period difference $t_s-t_r$. The integration rate, or gain, of the comparison circuit is determined by the frequency of the clock pulses CLK3 driving the counter, the period difference $t_s-t_r$ being effectively weighted by a factor $C_1$ determined solely by the clock frequency.

Figure 6D:
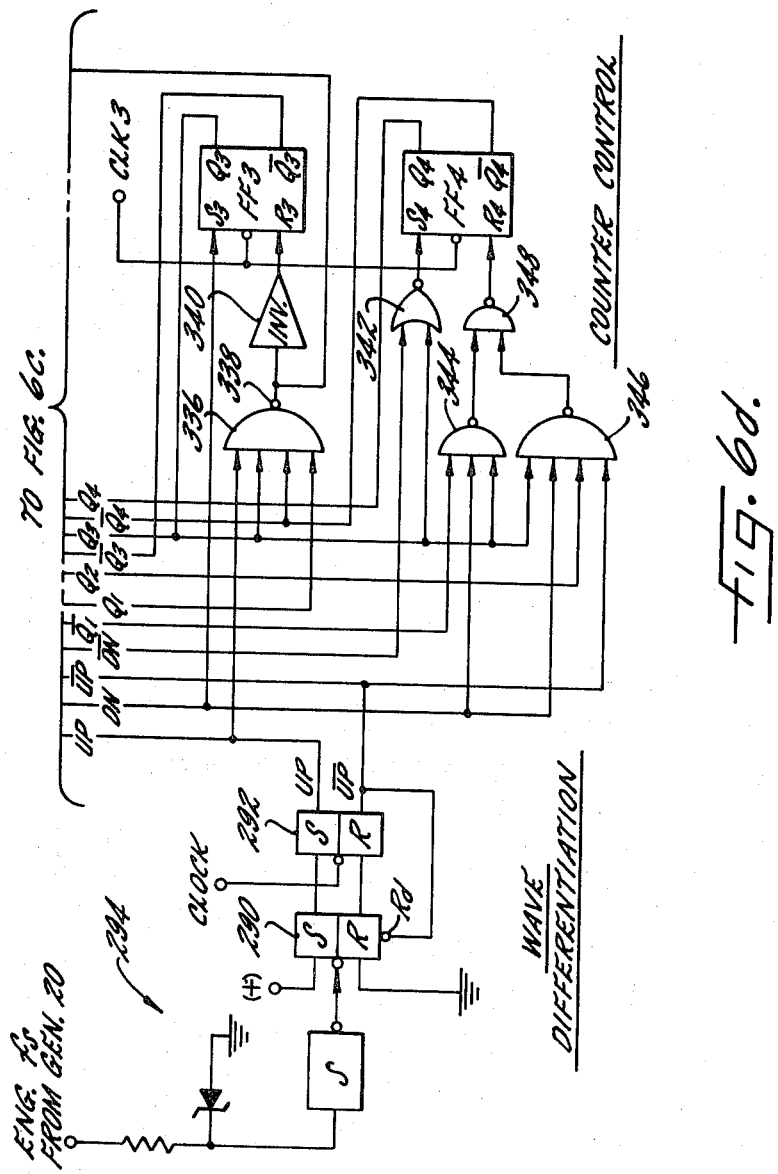

For convenience of description, the comparator-integrator shown in FIGS. 6c–6e is broken down into three sections respectively performing the functions of wave differentiation, counter control and count-accumulation.

Wave differentiation refers to the generation of extremely narrow pulses at the beginning of each successive period of the reference and speed pulses respectively. As seen in FIG. 8, the output from the reference signal generator (REF) is a square wave. In order to obtain period information independent of pulse width, the pulses REF are differentiated digitally in a uni-polar manner to provide the train of narrow spikes 267 shown at the bottom of FIG. 8. Turning to FIG. 6c, the circuitry for digital differentiation includes a pair of clocked flip-flops 270, 272 connected in tandem, the S and R outputs 274, 276 of the first flip-flop 270 being connected to the S and R inputs 278, 280 respectively of the second flip-flop 272. The R output terminal of the second flip-flop is connected to the direct reset terminal $R_d$ of the first flip-flop. The S and R inputs of the first flip-flop are respectively connected to logic 1 (the positive supply) and ground, while the clock terminal thereof is connected to receive the output signal REF from the reference signal generator through a squaring circuit 282 comprising a Schmitt Trigger 284 having an input connected to receive the reference pulses through a resistor 286. A Zener diode 288 limits the peak voltage of the input signal to a level compatible with the requirements of the Schmitt Trigger 284. The toggle terminal of a second flip-flop 272 is driven by the high frequency clock pulses CLK3, the frequency of which will always be several orders of magnitude higher than the frequencies $f_r$ and $f_s$ of the reference and speed pulses.

The flip-flops 270, 272 are normally in their reset state. A REF input pulse through the resistor 286 is squared in the circuit 282, the leading edge of the input pulse serving to trigger flip-flop 270 into its set state. The next occurring CLK3 pulse will shift the set state to the second flip-flop 272, driving the S output high and the R output low. The falling voltage at the R output, via the reset terminal $R_d$, resets the first flip-flop 270. The next CLK3 pulse shifts the reset state from the first flip-flop 270 to the second flip-flop 272, causing the R output thereof to go high and the S output to go low. This leaves the first flip-flop 270 in the reset state in readiness for receiving the next REF pulse through the resistor 282. It is therefore seen that the occurrence of a pulse at the input of the squaring circuit 282 results in a momentary assumption of the reset condition by the flip-flop 272 for a period equal to one cycle of the high frequency clock signal CLK3.

The engine (ENG) or speed pulses $f_s$ from the speed signal generator 20 are fed through an identical wave differentiator (FIG. 6d) consisting of cascaded flip-flops 290, 292 and a squaring circuit 294. The structure and operation of this circuit is identical to that of the circuit just described.

The purpose of the counter control logic is to convert the period information ($t_r$, $t_s$) obtained from the wave differentiators just described into control signals for gating high frequency clock pulses to the binary up-down counter so that the counter counts up for a period of time proportional to the speed pulse period $t_s$ and down for a period of time proportional to the reference pulse period $t_r$. At the beginning of any comparison cycle the binary count present in the counter is the accumulated total of all previous speed errors. The new comparison of the periods $t_s$ and $t_r$ is performed by counting up or down about this accumulated error total for a marked period of time. At the end of this period the new error total in the counter is shifted in parallel fashion into a holding register to update the servo control signal Z. The time at which the holding register is updated is designated the MARK time.

To this end the counter control logic shown in FIGS. 6c and 6d includes three primary control gates 300, 302, 304 respectively providing the count-up, count-down and the MARK signals. The count direction control gates 300, 302 selectively control the flow of high frequency pulses CLK3 from a common input line 306 to the counter. To control these gates properly the history of the system since the last MARK time must be kept. This history is stored in four flip-flops, FF1–FF4 (each possessing the J-K operating characteristics of Texas Instruments Device SN7473), having inputs $S_1$, $R_1$ through $S_4$, $R_4$ respectively and outputs $Q_1$, $\overline{Q_1}$ through $Q_4$, $\overline{Q_4}$ respectively. For proper synchronism each flip-flop FF1–FF4 is additionally connected to the clock source CLK3. For simplicity of description the leads constituting the control matrix for the counter control logic have been identified at the top of FIGS. 6c and 6d. The S and R output leads respectively of the flip-flop 272 are designated Dn and $\overline{Dn}$ in the matrix, while the S and R outputs of the flip-flop 292 are designated UP and $\overline{UP}$. These designations are chosen because the reference pulses REF command counting down while the speed pulses from the flip-flop 292 command counting up. The history of the up-gating circuit is held in the upper two flip-flops FF1 and FF2, which will be hereinafter referred to as the up-search and up-count flip-flops respectively, Similarly, the history of the down-gating circuit is held in the lower two flip-flops FF3 and FF4 which will be designated the down-search and down-count flip-flops respectively.

Controlling the inputs to the flip-flops FF1–FF4 is a group of decoding gates receiving inputs from the matrix. The reset input $R_1$ of the flip-flop FF1 is controlled by a four input NAND gate 320 having an output at a terminal 322 which is inverted in an inverter 324. The set input $S_2$ of the flip-flop FF2 is controlled by a two input NOR gate 326, while the reset input $R_2$ is controlled by a three input NAND gate 328 and a four input NAND gate 330 having outputs coupled to a NAND gate 332. The down-search and down-count flip-flops FF3 and FF4 respectively are controlled in a similar manner. The reset input $R_3$ of the flip-flop FF3 is controlled by a four input NAND gate 336 producing an output at a terminal 338 which is inverted in an inverter 340. The set input $S_4$ of the flip-flop FF4 is controlled from a two input NOR gate 342, while the reset input $R_4$ is controlled by a three input NAND gate 344 and a four input NAND gate 346 having outputs coupled to a two input NAND gate 348.

The gates 320–348 can readily be seen by one skilled in the art to provide the following logic input conditions, expressed in Boolean equations, to the flip-flops FF1-FF4.

$$S_1 = Up \quad (1)$$
$$R_1 = D_n \cdot Q_1 \cdot \overline{Q_2} \cdot Q_3 \quad (2)$$
$$S_2 = \overline{\overline{Up} + Q_1} = Up \cdot \overline{Q_1} \quad (3)$$
$$R_2 = \overline{(Q_3 \cdot Up \cdot Q_1)} \cdot \overline{(Q_1 \cdot Up \cdot Q_4 \cdot Dn)} = (\overline{Q_3} \cdot Up \cdot Q_1) + (Q_1 \cdot Up \cdot Q_4 \cdot Dn) \quad (4)$$
$$S_3 = D_n \quad (5)$$
$$R_3 = Up \cdot Q_3 \cdot \overline{Q_4} \cdot Q_1 \quad (6)$$
$$S_4 = \overline{(Q_3 + \overline{D_n})} = \overline{Q_3} \cdot D_n \quad (7)$$
$$R_4 = \overline{(\overline{Q_1} \cdot D_n \cdot Q_3)} \cdot \overline{(Q_3 \cdot D_n \cdot \overline{Q_2} \cdot Up)} = (\overline{Q_1} \cdot D_n \cdot Q_3) + (Q_3 \cdot D_n \cdot \overline{Q_2} \cdot \overline{Up}) \quad (8)$$

The logic inputs to the flip-flops FF1–FF4 will be more readily understood from the operational description to follow. For the present, it should be recognized that any flip-flop input, $S_2$ for example, will be high (logic 1) only when its corresponding input condition, as defined by the above Equations 1–8, is present in the control matrix (i.e., UP · $\overline{Q_1}$).

The MARK pulse is generated by the NAND gate 304 which has first and second inputs respectively connected to the NAND gate outputs 322 and 338 and a third input controlled by a NAND gate 352. The logic condition defining the MARK pulse is represented by the following equation:

$$\text{MARK} = \overline{(D_n \cdot \overline{Q_2} \cdot Q_4 \cdot Up)} \cdot \overline{(D_n \cdot Q_1 \cdot \overline{Q_2} \cdot Q_3)} \cdot \overline{(Up \cdot Q_3 \cdot \overline{Q_4} \cdot Q_1)}$$
$$= (D_n \cdot \overline{Q_2} \cdot Q_4 \cdot Up) + (D_n \cdot Q_1 \cdot Q_1 \cdot \overline{Q_2} \cdot Q_3) + (Up \cdot Q_3 \cdot \overline{Q_4} \cdot Q_1) \quad (9)$$

The common input line 306 of the count up and count down gates 300 and 302 is driven by a NOR gate 356 having a pair of inputs 358, 360 connected respectively to the MARK line and the complement $\overline{CLK3}$ of the pulses from the high frequency clock source. The gate 356 insures that the clock pulses $\overline{CLK3}$ are not fed to the up-down counter whle its contents are being shifted to the holding register upon the occurrence of the MARK pulse. Each of the direction controlling gates 300 and 302 has a second and third input controlled by the up-count and down-count flip-flops FF2 and FF$, so that the resultant control equations for the gates 300 and 302 are as follows:

Count Up = $Q_2 \cdot \overline{Q_4} \cdot \overline{(\overline{CLK3} + MK)} = Q_2 \cdot \overline{Q_4} \cdot CLK3 \cdot \overline{MK}$ 18 (10)

Count Down = $Q_4 \cdot \overline{Q_2} \cdot \overline{(\overline{CLK3} + MK)} = Q_4 \cdot \overline{Q_2} \cdot CLK3 \cdot \overline{MK}$ (11)

From these equations (10) and (11) it is seen that the counter is commanded to count up by the clock pulses $\overline{CLK3}$ only when the up-count flip-flop FF2 is in the set state and the down-count flip-flop FF4 is in the reset state. Similarly, the counter is commanded to count down by the clock pulses $\overline{CLK3}$ only when the down-count flip-flop FF4 is in the set state and the up-count flip-flop FF2 is in the reset state.

With these fundamental relationships in mind, the operation of the counter control logic in controlling the up-down counter will become apparent upon reference to FIG. 9. This figure shows the engine speed pulses ENG, the reference pulses REF and the binary count in the up-down counter measured against a common time base. For simplicity of explanation the time base for the engine and reference signals has been divided into count (C), wait (W) and search (S) periods to illustrate the function of the memory circuits in the counter control logic. At the time designated MARK the binary number in the counter is shifted into the holding register to update the servo correction number Z. Basically, the objective of the counter control logic is to control the opening and closing of the count-up and count-down gates 300, 302 and to produce a MARK pulse when both gates 300, 302 have been opened the required amount of time. The flip-flops FF1–FF4 facilitate proper control of the gates by keeping the history of the system since the last MARK output.

Referring to the signals shown in FIG. 9, it is seen that between successive MARK outputs there occurs at least one period $t_s$ of the engine or speed signal, which is compared to one period $t_r$ of the reference signal. For example, during the period $\tau_3$ through $\tau_6$ there occurs one comparison, during which the up-down counter counts down for the interval $\tau_4 - \tau_3$ and counts up for the interval $\tau_6 - \tau_5$ corresponding respectively to the periods $t_r$ and $t_s$. During the period $\tau_5 - \tau_4$ the counter remains idle, since, during this time interval, the reference period $t_r$ timingly overlaps the speed period $t_s$. In the example shown, the engine frequency or speed has fallen below the reference frequency, resulting in an increasing servo control number Z from $\tau_3$ to $\tau_6$. In other words, at the MARK output (occurring at the time $\tau_6$) the binary number in the holding register is updated from the value $Z\tau_3$ to $Z\tau_6$. The difference between the binary numbers in the counter at $\tau_6$ and $\tau_3$ is a weighted measure of the period difference $t_s-t_r$, while the binary number $Z\tau_6$ itself is a digital representation of the time integral of the period difference. In the example shown, the reference and speed pulses are at constant frequencies, resulting in an average servo control number (represented by the broken line $Z_a$) increasing linearly with time.

The operation of the control logic shown in FIGS. 6c and 6d will now be related to the timing diagram of FIG. 9. The counter control logic can be seen to make decisions upon the occurrence of either an engine ENG or reference REF pulse (at times $\tau_0$, $\tau_1$, $\tau_2$ etc.). Upon occurrence of either type of pulse the counter control logic effectively surveys the history of the counter operation, as contained in the flip-flops FF1–FF4, since the last MARK output. To illustrate the operational sequence, the states of the flip-flops FF1–FF4 are shown for a representative period of time beginning immediately prior to $\tau_3$ and ending immediately after $\tau_8$. Also, the condition of the counter direction control gates 300, 302 and the MARK gate 304 are shown, with the symbols (−) and (X) indicating the disabled and enabled states respectively.

| Decision Pulse | Dn | Up | Dn | Up | Dn | Up | |
|---|---|---|---|---|---|---|---|
| Time | $\tau_3-$ | $\tau_3+$ | $\tau_4+$ | $\tau_5+$ | $\tau_6+$ | $\tau_7+$ | $\tau_8+$ |
| $Q_1$ | 1 | 0 | 1 | 1 | 1 | 1 | 1 |
| $\overline{Q}_1$ | 0 | 1 | 0 | 0 | 0 | 0 | 0 |
| $Q_2$ | 0 | 0 | 1 | 1 | 1 | 1 | 0 |
| $\overline{Q}_2$ | 1 | 1 | 0 | 0 | 0 | 0 | 1 |
| $Q_3$ | 1 | 1 | 1 | 1 | 0 | 1 | 1 |
| $\overline{Q}_3$ | 0 | 0 | 0 | 0 | 1 | 0 | 0 |
| $Q_4$ | 1 | 1 | 1 | 0 | 0 | 1 | 1 |
| $\overline{Q}_4$ | 0 | 0 | 0 | 1 | 1 | 0 | 0 |
| Count Up | − | − | − | X→ | X→ | − | − |
| Count Down | X→ | X→ | − | − | − | − | X→ |
| MARK | − | X | − | − | X | − | − |

The above table is verifiable by reference to the equations 1–11 set forth above. The search (S) periods shown in FIG. 9 for the engine and reference pulses correspond to the occurrence of the reset condition of the up-search and down-search flip-flops FF1, FF3, respectively.

To illustrate the correlation between the equations 1–11 and the above table, the response to an engine speed pulse occurring at $\tau_6$ will be analyzed. From the table, it will be noted that immediately prior to $\tau_6$ the flip-flops FF1–FF3 are each in the set condition, while the down-count flip-flop FF4 is reset. The occurrence of an engine pulse (UP pulse after differentiation satisfies equation 1 but no change in the state of the flip-flop FF1 occurs since this flip-flop is already in the set state. Neither equation 3 nor equation 4 is satisfied, thus the flip-flop FF2 remains in the state which it had assumed at $\tau_5$ ($Q_2 = 1$, $\overline{Q}_2 = 0$). Equation 6 is satisfied, thus the flip-flop FF3 changes from the set to the reset state. Neither equation 7 nor equation 8 are satisfied, thus the flip-flop FF4 remains in the reset state. Note that in considering equations 1 through 8 the states of the flip-flops FF1–FF4 immediately prior to the operative DN or UP pulse is considered because flip-flop state changes are sequential in nature. On the other hand, the table entries for the outputs of the count-up and count-down gates 300, 320 and the MARK gate 304 are simple logic AND functions and require consideration only of the flip-flop states after the occurrence of the operative DN and UP pulses.

In accordance with the present invention, comparator-integrator described above maintains a constant gain and integration rate regardless of the speed of the engine or reference pulses. An example of this feature is presented in FIG. 10, which shows the signals of interest plotted on a time base identical to that shown for FIG. 9. The only difference between the signals plotted in FIG. 9 and FIG. 10 lies in the fact that in FIG. 10 the speed or frequencies $f_s$ and $f_r$ of both pulse trains are four times those shown for FIG. 9. Nonetheless, the integration rate represented by the slope of the curve $Z_a$ in FIG. 10 remains the same as that shown in FIG. 9 for the much lower speed. Thus, unlike presently available analog governors, the gain margin of the present governor is entirely independent of operating speed or reference speed. the only effect which increased speed has on the functioning of the accumulator circuit is to decrease the count over which the up-down counter must traverse between marks and to increase the frequency at which the holding register, as triggered by the MARK output, is updated.

Figure 11:
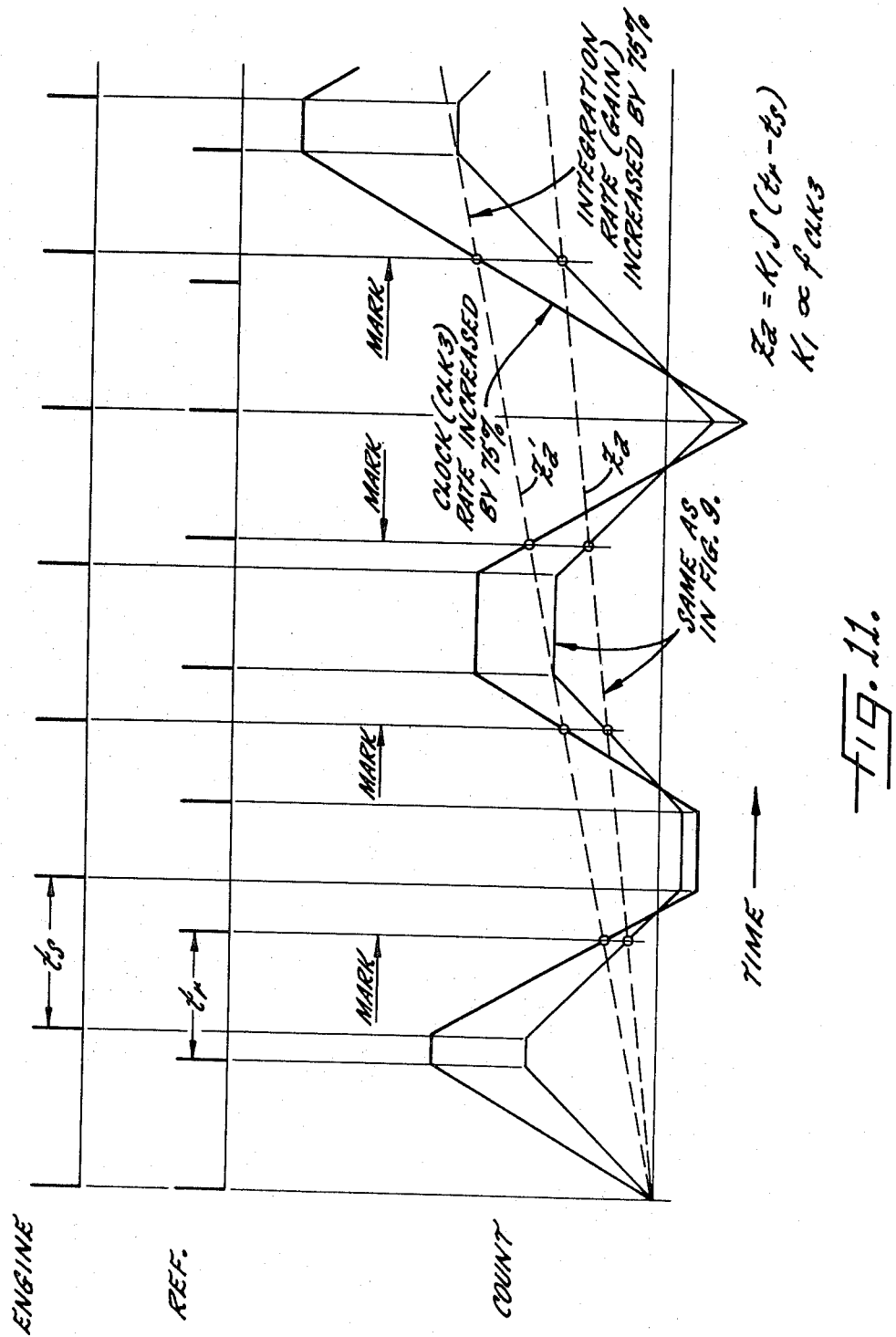

In accordance with a further feature of the present invention, the gain or rate of integration of the comparator-integrator may be varied by a simple adjustment in the frequency of the clock pulses CLK3. Referring to FIG. 11, engine and reference pulses are shown in a time relationship identical to that shown in FIG. 9 and, additionally, there is shown a comparison between the counter performance shown in FIG. 9 and counter performance for a 76 percent increase in the clock frequency $f_c$ of the pulses CLK3. As will be appreciated, the integration rate increases in a 1:1 ratio with the clock rate. The accomplishment of this objective is attributed to the digital nature and particular design techniques employed for the comparator-integrator described above.

Before describing the counter itself it is noted that means are provided for delaying the updating of the holding register for one clock period after the occurrence of the MARK output from the counter control logic. As shown in FIG. 6c, the MARK output from the NAND gate 304 is coupled to a clocked RS flip-flop 366 having cross coupled feedback paths 368, 370 for respectively coupling the S output to the R input and the R output to the S input. The latter coupling is not direct however. Rather, the R output, along with the MARK signal, is fed to an AND gate 372 controlling the S input 374 to the flip-flop 366. The integrator clock signal CLK3 drives the toggle terminal 376 of the flip-flop. In this configuration, the flip-flop 366 acts as an inhibited JK flip-flop. The flip-flop is normally in the reset state, providing a logic 0 at an output terminal 378. Upon the occurrence of a MARK pulse, the S input terminal 374 is enabled through the AND gate 372. The flip-flop then toggles to the set state upon the occurrence of a CLK3 pulse, producing a logic 1 at the output terminal 378 for updating the holding register. The next CLK3 pulse toggles the flip-flop 366 to the reset state. Since the MARK pulse only lasts for a time period corresponding to the pulse width of the clock pulse CLK3 and since the set input 374 is enabled only during the MARK pulse, the flip-flop 366 remains in the reset state until occurrence of the next MARK pulse, at which time another command pulse will be generated at the terminal 378 for updating the holding registers. The output signal from this circuit is designated MKC to distinguish it from the MARK signal from the gate 304.

To this point, the control logic and overall function of up-down counter and its associated holding register have been described. The physical circuits employed for the counting and holding function are shown in FIG. 6e. The count-accumulation function performed by this apparatus essentially consists of (A) measuring the time difference between the periods $t_s$ and $t_r$ of the reference and speed pulses to produce an instantaneous weighted measurement of the time difference and (B) accumulating these measurements to produce the number Z digitally representing the time integral of the weighted period difference C ($t_s - t_r$). The up-down count function is performed by a 12-bit binary synchronous counter 400 having a first input terminal 402 for receiving count-up command pulses and a second input terminal 404 for receiving count-down command pulses. The counter 400 is represented as having three separate parts 400A, 400B and 400C to illustrate the fact that a desirable hardware implementation, and one used in practice, includes the use of three separate four-bit counters connected in tandem, each counter typically being of the type SN74193N manufactured by Texas Instruments and described above in connection with the digital-to-analog converter shown in FIG. 6a. The respective stages of the binary counter 400 are provided with input terminals L1–L12 for direct setting of each stage. However, the appearance of data on the terminals L1–L12 does not automatically set the respective stage of the counter to a predetermined state. Rather, the setting or loading of the counter is controlled by load control terminals 406, 408 and 410 of the respective sections 400A, 400B and 400C. A common LOAD line 412 joins all three load control terminals 406, 408, 410 and is connected to be controlled by a load control gate 414. Similarly, the control terminals L1–L12 for directly setting the counter stages are tied to a common DATA line 416 which is controlled in a manner to be described below. Thus, upon occurrence of a pulse on the LOAD line 412 the counter will be set to the maximum count (all 1's) or minimum count (all 0's) depending upon whether the logic state appearing on the DATA line 416 is respectively 1 or 0. Additional outputs 418, 420 are provided to indicate the carry and borrow conditions in the counter and are designated respectively CRY and BRW. As noted above with respect to the similar counter used in the pulse width modulator of FIG. 6a, a logic 0 is generated on the CRY output only when the counter 400 reaches its maximum count (all 1's), while a logic 0 is generated at the BRW output only when the counter 400 reaches its minimum count (all 0's).

The logic states of the 12 stages of the counter 400 are monitored on output lines designated B1–B12 in a parallel fashion. At any given time, the MARK time for instance, the logic states appearing at the outputs B1–B12 comprise a binary number corresponding to the instantaneous count which the counter 400 has achieved.

For the purpose of sampling and holding the binary number appearing in the counter 400, there is provided a 12-bit holding register 430 having input terminals $H_1$ through $H_{12}$ respectively connected to the output terminals $B_1$ through $B_{12}$ of the counter 400. The register 430 is illustrated as having three separate sections 430A, 430B and 430C each of which may be a four-bit holding register designated a Bistable Latch type SN7475 manufactured by Texas Instruments Incorporated. Each stage of the holding register 430 consists of a simple flip-flop having a single input terminal, an output terminal and a clock terminal. In operation, the logic level of the output of the latch circuit will change to assume the logic level at the input of the latch circuit only when the clock input is 1. When the clock input is 0, the output of the latch cannot change. Each of the sections 430A–430C of the holding register 430 thus has four latch circuits controlled by a single clock toggle terminal 432, 434, 436 respectively. The clock terminals are connected to a common line 438 on which the output signal MKC of the counter control logic appears. The outputs of the 12 stages in the holding register 430 are designated $Y_1$–$Y_{12}$ respectively and signal the binary servo control number Z. In parallel binary fashion the number Z is fed to the digital-to-analog converter (FIG. 6a) and, in the embodiments shown in FIGS. 2–4, to the reference signal generator 22.

The operation of the counter 400 and the holding register 430 have already been broadly described in connection with the counter control logic shown in FIGS. 6c and 6d and the associated timing diagrams shown in FIGS. 9, 10 and 11. Briefly recapping the operation with reference to FIG. 9, it is noted that between successive MARK outputs (at $\tau_3$ and $\tau_6$ for example) full periods $t_r$ and $t_s$ of the reference and engine signals are compared in that the counter 400 counts up and down for intervals respectively corresponding to the periods $t_s$ and $t_r$. During overlapping portions of the two periods being compared the counter remains idle. The instantaneous count in the counter 400, shown as the lower signal in FIG. 9, appears at the parallel counter output terminals $B_1$–$B_{12}$ in FIG. 6e. At the proper time, the MARK time, a control pulse MKC is generated on the line 438 to shift the instantaneous count in the counter 400 into the holding register 430 to update the number Z contained therein. In the example shown in FIG. 9, the contents of the register 430 (and thus the servo number Z) are updated at $\tau_3$, $\tau_6$, $\tau_9$, etc. in a step fashion.

From the foregoing and by inspection of FIGS. 6c, d, e it may now be seen that the comparator-integrator 40 has as its information input two pulse trains having parameters (i.e., the periods $t_r$ and $t_s$) which may vary with time. The comparator-integrator is made up of a source of recurring input signals, i.e., the CLK3 pulses, which have a predetermined frequency greater than that of the input pulse trains; a reversible counter 400; a holding register 430; and an associated logic control system.

The latter includes first storage and gating means responsive to a pulse of the first pulse train to begin a measurement cycle (at time $\tau_3$ of FIG. 9, for example) by causing the counter 400 to count the clock pulses CLK3 in one direction (down) until either the next pulse of the first train or the first pulse of the second pulse train appears (i.e., at $\tau_4$). Similarly the logic system has second storage and gating means placed in readiness by the first pulse of the second pulse train (i.e., at $\tau_4$) and rendered effective to initiate counting of the clock pulses CLK3 in the opposite direction after a second pulse of the first pulse train occurs (i.e., at $\tau_5$). Finally, there is provided means responsive to the appearance at the MARK instant (i.e., at $\tau_6$) of the next pulse of the second pulse train for transferring into the register 430 the number $Z\tau_6$ contained in the counter 400. This transfer completes the measurement cycle and the logic begins a new measurement cycle beginning with the same pulse (at $\tau_6$) of the second train of pulses which ended the previous measurement cycle. Therefore, the MARK instants measure off the successive iteration periods n, and the counter will —because of the logic system— be idle during a portion of the measuring cycle during which the periods $t_s$ and $t_r$ overlap (i.e., $\tau_4$ to $\tau_5$). The effect of these sequences is that during each iteration period the number held in the counter is changed by an amount and in a sense corresponding to the magnitude and sign of the difference ($t_s$–$t_r$) between the instantaneous values of the periods $t_s$ and $t_r$. Thus, the iteratively updated number Z in the holding register 430 varies according to the expression:

$$Z_n = Z_{n-1} + C(t_s-t_r)_n$$

where C is a gain factor determined by the CLK3 frequency. Because the iteration intervals are quite short, the Z number may also be expressed as a function of time:

$$Z = \int_0^t C_1(t_s-t_r)dt$$

i.e., as varying as the time integral of the difference between the periods ($t_s$–$t_r$) multiplied by a chosen and selectable gain factor $C_1$.

The counter 400 and register 430 shown in FIG. 6e each have a capacity of 12 bits; therefore, the maximum value which the servo control number Z can obtain is 111111111111, or $2^{12}$. For the majority of applications a range of 0 through $2^{12}$ for the number Z is sufficient. However, in certain instances, the difference in the periods $t_r$ and $t_s$ will call for a servo control signal in excess of the maximum count available from the counter 400. Also, between successive MARK times, the counter may be subject to excursions well beyond its capacity. With no limiting or overflow protection available, the binary intelligence contained in the counter would be lost entirely each time the count exceeded all 1's or fell below all 0's. In other words, the servo control signal Z is proportional to the accumulated difference measurements between the periods $t_s$ and $t_r$ only while said accumulated difference measurements are within a predetermined range defined by the capacity of the counter 400.

Accordingly, it is a feature of the present invention that overflow protection is provided such that whenever the accumulated difference measurements exceed or fall below said predetermined range, the servo control signal Z will assume a fixed maximum or minimum value respectively until said accumulated difference measurements again fall within the predetermined range.

To this end, the apparatus shown in FIG. 6e for providing the countaccumulation function further includes an auxiliary counter 450 adapted to register the number of times by which the count in the primary counter 400 goes above or below its maximum range. Thus, the counter 450 has up and down command input terminals 452, 454 respectively connected to the CRY and BRW output terminals 418, 420 of the primary counter 400. Typically, the counter 450 may be of the type SN74193N previously described. The successive stages of the auxiliary counter 450 have input terminals, here designated as L13–L16, by which each counter stage may be directly set to a predetermined logic level upon the occurrence of a load control pulse at a control terminal 456. In the present instance, the terminals L13–L16 are tied to a common input terminal 458 maintained at the logic 1 level. The outputs of the four counter stages are brought out on terminals $Q_a$–$Q_d$ in parallel fashion. The most significant bit of the counter 450, monitored on the terminal $Q_d$, controls the logic state on the DATA line 416. However, to insure proper timing and to avoid false triggering, the $Q_d$ output and the inverted clock signal $\overline{CLK3}$, are effectively combined in controlling the data line 416. A flip-flop 460 consisting of cross-coupled NAND gates 462 and 464 has complementary input lines 466, 468 connected to the outputs of a second pair of NAND gates, 470, 472 respectively. The complement of the CLK3 pulse provides one input to each of the NAND gates 470, 472, while the other inputs to the gates are respectively connected to the line 468 and the most significant counter output $Q_d$. With this arrangement, the flip-flop 460 and the associated gates 470, 472 operate to cause the signal on the DATA line 416 to follow the complement of the most significant bit, as monitored on the output $Q_d$ of the auxiliary counter 450, whenever the signal CLK3 is low.

For keeping track of the AND of all the bits of the auxiliary counter 450, there is provided a second flip-flop 476, consisting of cross-coupled NAND gates 478 and 480 effectively controlled by the output 482 of a NAND gate 484 connected to receive the outputs $Q_a$–$Q_d$ of the counter 450. A two-input NAND gate 486 inverts the NAND output on the terminal 482, subject to the logic level of the $\overline{CLK3}$ signal. An overflow line 488 connects the output of the flip-flop 476, as taken from the NAND gate 480, to one input terminal 490 of the load control gate 414. The other input terminals 492, 494 of the gate 414 are connected to receive the CLK3 and MARK signals respectively. The overflow line 488 is essentially a monitor of the overflow or underflow condition in the primary counter 400. The four-bit counter 450 contains all 1's except when the counter 400 is overflowing or underflowing. Thus, the logic level on the line 488 will be 0 only if the overflow counter contains all 1's.

For a better understanding of the limiting and overflow functions performed by the apparatus described in the preceding paragraphs, a few basic facts should be kept in mind. First, the condition of the auxiliary overflow counter 450 is monitored only at the MARK time. Second, the overflow counter 450 will act merely as an extension of the primary counter 400 so long as the overall count at the MARK time (the end of the counting cycle) is within the capacity of the primary counter 400. The expanded counter allows for much wider excursions of the count between successive MARK pulses without any loss in the credibility of the information in the counter. Even the expanded counter can overflow without losing information, so long as the number of rollovers equals the number of rollbacks between successive MARK times.

At the end of the comparison period (the MARK time), if the number of BRW pulses from the terminal 420 equals the number of CRY pulses from the terminal 418, no limiting is done, since the number in the primary counter 400 is within the counter range. If the number of CRY pulses exceeds the number of BRW pulses, the primary counter 400 does not hold a valid number, and the counter 400 is set to the largest value it can hold (all 1's). Similarly, if the number of BRW pulses exceeds the number of CRY pulses, the counter 400 is set to the smallest value it can hold (all 0's). The overflow logic performs the limiting in the following manner. The counter 450 is set to 1111 at the beginning of each counting cycle. If the counter 450 is incremented, it goes to 0000, 0001, 0010,..., and if it is decremented, it goes to 1110, 1101, 1100,... Thus the most significant bit, monitored on the line $Q_d$ is 0 if the primary counter 400 is over its maximum value, and 1 if the counter 400 is at or under its minimum value. The flip-flop 460 keeps track of this most significant bit, while the flop-flop 476 keeps track of the AND of all the bits in the counter. These flip-flops prevent a loop when limiting is done. If when the MARK pulse occurs, the counter 450 is not at 1111, the load output on line 412 becomes active (logic 0 ) and the counter 400 is set by the logic complement (on the data line 416) of the most significant bit of the auxiliary counter 450. At the same time that this maximum or minimum number appears in the counter 400, the control line 438 for the holding register 430 is activated by a MKC pulse to update the servo control number Z to the value of the number appearing in the counter 400. Activation of the load line 412 also causes the four-bit counter 450 to be reset to the all 1's condition, and the occurrence of the next clock pulse CLK3 resets the flip-flop 476 so that the overflow signal on line 488 is 0. This deactivates the LOAD line 412 so that the primary counter 400 can begin its next comparison of the periods $t_s$ and $t_r$. The beginning count for the next comparison period will be the limited value to which the counter is now reset.

Figure 12:
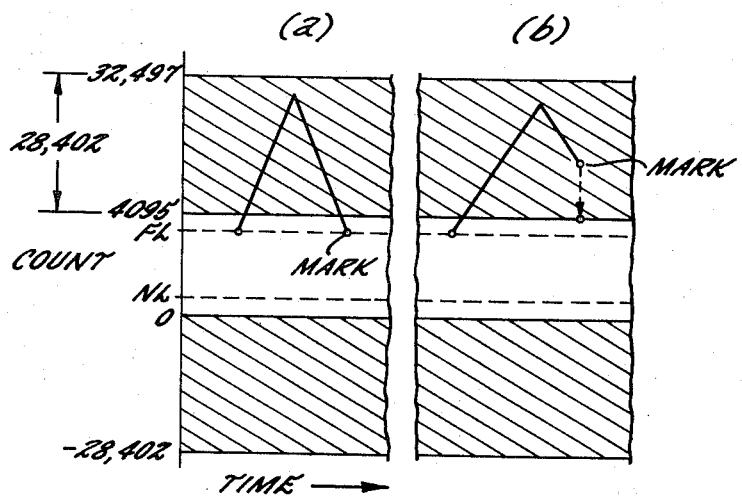

The graphs shown in FIG. 12 illustrate the overflow (example $a$) and limiting (example $b$) capabilities of the overflow control circuit shown in FIG. 6e and described above. The binary number FL is the predetermined full-load value of the servo control signal Z for a chosen load, while the number NL is the corresponding no-load value of the control signal Z. The cross-hatched regions represent the range of the four-bit overflow control counter 450. Example ($a$) illustrates the operation of the counter when the number Z has achieved it steady state value, in which case the count at the beginning and end of the comparison period is the same. During the comparison period, however, the instantaneous count rises far into the region covered by the overflow counter and returns to the initial value $F_L$. No loss of information occurs. In example ($b$) the MARK occurs while the count is in the overflow region, in which case the primary counter 400 is set to its maximum value. Naturally, the number Z monitored at the output of the holding register 430 is also at its maximum value. Assuming a frequency of 10MHz for the signal CLK3 and a reference frequency $f_r$ of 3,000 Hz, the digital integrator shown, because of the overflow capability, can accurately track a drop in the frequency $f_s$ of the speed pulses to 315.11 Hz, or 10.5 percent of its rated value. In other words, the speed of the prime mover can drop to 10.5 percent of its rated value before the actual magnitude of the control variable Z loses its significance. Such an extreme speed error and large value of Z would in most cases drive the throttle valve to its maximum opening limit anyway, so that full corrective action is achieved and the saturation is not a serious disadvantage. But proportional control can be had over a wide range of integrated speed errors. When the frequency of the signal CLK3 is lowered to 1 MHz, an ever greater drop in engine speed (to 1.16 percent of rated speed) can be tolerated without saturation.

It will be readily appreciated by one skilled in the art that the overflow counter 450, like the primary counter 400, may be increased or decreased in length to suit the gain requirements of the particular governor application with which it is used. To obtain optimum performance, the integrator gain should be as great as possible, and typically the frequency of the clock pulses CLK3 will be in excess of 2MHz. It will be recalled from the discussion of FIGS. 10 and 11 that the gain of the governor control loop is directly proportional to the frequency of the clock pulses CLK3. Indeed, a feature of the present invention lies in the total independence of loop gain from changes in the reference and engine frequencies. When extremely high gain is required, it will be desirable to use higher capacity overflow counters in place of the four-bit counter 450. The only modification required to the circuitry shown in FIG. 5d would be the inclusion of additional stages in the overflow counter 450 and corresponding expansion of the capacity of the NAND gate 484.

Figure 6F:
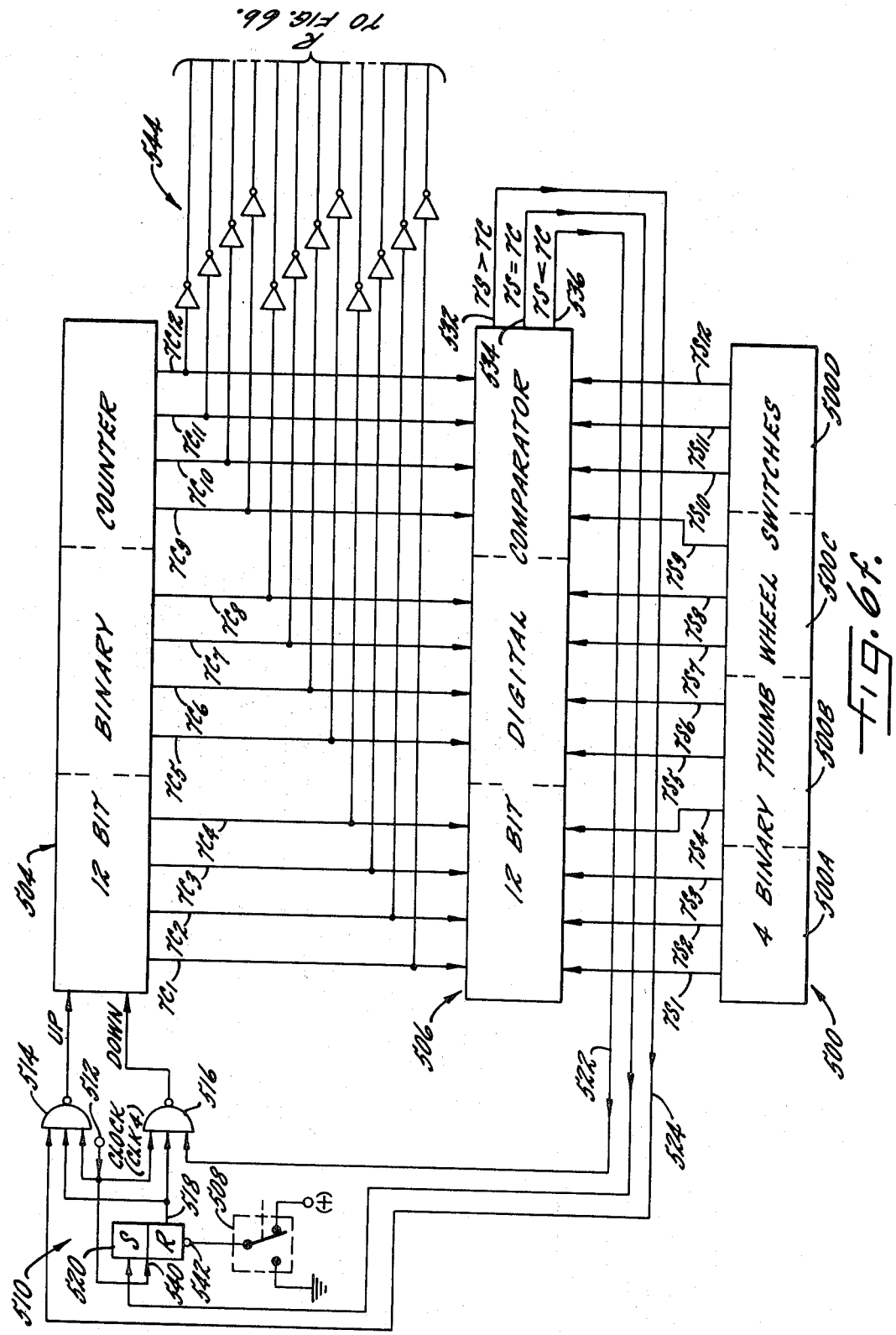

D. Speed Ramper Circuit (FIGS. 6f and 13)

If the operator has the power to change the set point number R instantaneously, the engine may be subjected to an excessive strain as the governor attempts to make engine speed closely follow the change in the set point number R. To avoid this problem, there is provided the speed ramper circuit of FIG. 6f, which operates to adjust gradually the set point number R to the desired new set point value regardless of how abruptly the operator enters his command.

The ramper circuit includes an input device 500 for the operator in the form of four thumb wheel switches 500A–500D for manual insertion of a desired decimal (four digits) number corresponding to the desired speed. The switches shown are intended to be of the type providing a binary encoded output, a feature available on many thumb wheel switches presently known to the art. Thus a 12-bit binary representation, here designated TS, of the four digit decimal number entered is provided on the 12 parallel output lines TS1–TS12. To achieve the stated purpose, the ramper circuit further includes a 12-bit binary up-down counter 504, a 12-bit digital comparator 506, a starter switch 508 and control logic 510. The counter 504 provides a 12 bit binary output number, here designated TC and earlier herein called $\overline{R}$, on parallel output lines TC1–TC12, one line providing an output from each stage of the counter 504.

It is desired that in the steady state condition the binary output number TC of the counter 504 will equal the output number TS of the switches 500A–500D. When the operator commands a change by adjusting the thumb wheel switches 500A–500D it is desirable to have the number TC in the counter 504 approach the commanded input number TS on the lines TS1–TS12 gradually so that the governor can bring the speed of the prime mover 10 to its desired new value without danger of serious overshoot or of damage to the prime mover 10.

The gradual change in the set point number R is accomplished by having the counter 504 count up or down to its desired new number gradually at a predetermined rate. The predetermined rate is that determined solely by the frequency of a clocked pulse signal CLK4 provided at an input terminal 512 to the counter control logic 510. The terminal 512 is connected to an input to each of a pair of NAND gates 514, 516 respectively controlling counting-up and counting-down by the counter 504. A second input to each of the NAND gates 514, 516 is connected to the R output terminal 518 of a clocked RS flip-flop 520. In this way, the state of the flip-flop 520 determines whether the counter 504 is connected to be driven from the CLK4. The direction of count is determined by the logic level on a pair of lines 522, 524 which provide the third input to the gates 514, 516 respectively. The 12-bit digital comparator 506 is provided for the purpose of comparing the output number TC of the counter 504 to the commanded binary number TS from the switches 500A–500D. The comparators 506 may consist of three four-bit magnitude comparators type SN74L85 connected in cascade in the manner described at page 270 of Texas Instruments Catalog supplement CC301 cited above. The comparator 506 has three output terminals 532, 534, 536 for indicating the possible conditions of the compared number TC (appearing on lines TC1–TC12) with respect to the commanded number TS (on lines TS1–TS12) entered by the operator. The output 532 is at logic 1 if the number TC is less than the number TS, the output 534 is at logic 1 if the number TC equals the number TS and the output 536 is at logic 1 if the number TC is greater than the number TS. The terminals 532 and 536 are respectively connected to the lines 524 and 522 for enabling the up-command or down-command gates 514, 516 respectively. The terminal 534 is connected to the S input terminal of the flip-flop 520. The flip-flop 520 has a CLOCK input 540 connected to receive the clock signal CLK4 and a direct reset terminal 542 which, when grounded through manual switch 408, causes the flip-flop 520 to change to the reset state. A set 544 of inverters complements the number TC and produces the set point number R. As TC increases or decreases, R decreases or increases.

The operation of the circuit is illustrated in the graph of FIG. 13, in which the commanded number TS is shown as a broken line and the number TC is shown as a solid line. The time of actuation of the switch 508 is designated START. Two different frequencies for the clock signal CLK4 are represented. In the steady state condition 545 the number TC equals the number TS, and the counter 504 is shut off by virtue of the fact that the flip-flop 520 is in the set state, disabling the count control gates 514, 516. Until the flip-flop 520 is triggered to the reset state by the starter switch 508 at the START time, the changed binary value of the number TS has no effect on the set point number R. Assume that the operator sets in a new value for the number TS on the thumb wheel switches, which, it will be assumed, is higher than the number TC presently in the counter 504. He then actuates the starter switch 508 to momentarily ground the direct reset terminal 542 of the flip-flop 520. As the flip-flop 520 assumes the reset state, the count control gates 514, 516 are partially enabled. The comparator 506 provides an output 1 at terminal 532 to indicate that the new number TS is greater than the number TC. This output signal will remain at logic 1 until this comparison condition changes. Via the line 524, the output 532 of the comparison comparator 506 completes the enabling of the up-count control gate 514 to allow the pulses CLK4 to pass to the 12-bit counter 504. The binary number TC increases at a rate proportional to the frequency of the pulses CLK4 until equality is reached between the binary numbers TC and TS. This equality results in a logic 1 at the output terminal 534 of the comparator 506, which, in turn, sets the flip-flop 520 and disables the count control gates 514 and 516. The set point number R has assumed its desired new value equal to the complement of the number TC from the counter 504. A decrease in the number TS inserted by the operator, followed by operation of the switch 508 causes the counter and comparator to operate in a similar manner, but in a direction reverse to that described above.

Dynamic Operation of the Various Embodiments

The circuits employed in the various embodiments of the invention have been described individually above and their operational characteristics defined. Their combination in implementing the governor embodiments shown in FIGS. 1–4 and their operation under load variations will now be described.

In the embodiment of FIG. 1, the reference signal generator 22 may be simple pulse generator or it may consist of the digital variable frequency oscillator shown in FIG. 6b, although only one of the inputs thereto, the number R, is used in this embodiment. If the number R is provided by the digital ramper circuit shown in FIG. 6f, the set point speed may be adjusted to the desired value manually through operation of the four thumbwheel switches 500A–500D. Momentary actuation of the switch 508 initates the gradual change of the number R from its present value to the desired new value at a rate which can be followed by the governed system including the prime mover 10. The reference signal at terminal 248 (FIG. 6b) will stabilize at a frequency $f_r$ and have a period $t_r$ which remains constant at all times thereafter.

At steady state the period $t_s$ the speed pulses equals the period $t_r$ of the reference pulses and the counter control logic (FIG. 6c) causes the counter 400 (FIG. 6e) to count up and down for equal periods of time between successive MARK pulses. As a result, the servo control number Z appearing at outputs Y1–Y12 of the holding register 430 is at a stablized binary value, which has resulted from the integration of the period difference $t_s-t_r$ which existed while the prime mover 10 was off-speed. The number Z is fed to the counter 80 of the digital-to-analog converter (FIG. 6a) in a parallel fashion on lines 84a–84l. The counter 80 is continuously driven by the clock CLK1 from source 104 and counts up from the number Z to the all 1's condition and down from the number Z to its all 0's condition. The duty cycle of the signal on the line 114, and therefore the d. c. content thereof, is proportional to the number Z and provides an analog representation $\bar{Z}$ of the desired servo position. The signal $\bar{Z}$ is applied to an appropriate proportional actuator 16 to effect adjustment of the rate of energy flow through the throttle valve 14 to the prime mover 10, thereby completing the primary governor control loop.

Assume now that the load 18 on the prime mover 10 is increased. Momentarily the speed of the prime mover 10 decreases from the set point speed and the period $t_s$ of the speed pulses from the generator 20 increases. The counter control logic receives the speed and reference pulses through the wave differentiators shown in FIGS. 6d and 6c respectively. The increase in the period $t_s$ causes the counter control logic to hold the count-up gate 300 open for a longer period of time with respect to the period during which the count-down gate 302 is open. As a result, the binary number seen in the counter 400 (FIG. 6e) at successive MARK times increases. Since the contents of the counter 400 are transferred to the holding register 430 at the MARK times, the servo control number Z provided at the outputs Y1-Y12 of the register 430 also increases. As such, the number Z is a digital representation of the time integral of the period difference $t_s-t_r$. The increasing number Z is fed to the counter 80 of the digital-to-analog converter (FIG. 6a). The result is an increase in the count from which the counter 80 must count up and down to its limits. Since the analog output signal $\bar{Z}$ appearing on line 114 is high or logic 1 only during the count-down operation of the counter 80, the increase in the number Z from which the counter counts result in an increase in the d. c. content of the output pulse train $\bar{Z}$.

As the d. c. leVel of the signal $\bar{Z}$ increases, the actuator 16 commands a higher throttle valve setting to increase the flow of energy from the source 12 to the prime mover 10. As the speed of the prime mover 10 increases, the period difference $t_s-t_r$ decreases. In time, the speed of the prime mover 10 returns to the set point speed, at which time the period $t_s$ of the speed pulse equals the period $t_r$ of the reference pulses. Although the period $t_s$, returns to its original value, the output servo control number Z, due to the integrating characteristic of the comparator-integrator circuit of FIGS. 6c–6e, is stabilized at a new value which reflects the increase in the load 18 on the prime mover 10.

A decrease in the load 18 produces the opposite speed correction effect. As the speed increases from the set point speed, the period $t_s$ of the speed pulses decreases. The up-count control gate 300 (FIG. 6c) for the counter 400 (FIG. 6e) is held open for a shorter period of time with respect to the down-count control gate 302, and the period during which the counter 400 counts up between successive MARK pulses begins to decrease with respect to the period of counting down. The number Z in the holding register 430 is updated to successively smaller values at the MARK times. The decrease in the number Z on lines 84a–84l to the counter 80 of the digital-to-analog converter (FIG. 6a) effects a decrease in the time required to count down to all 0's in the counter 80 and a corresponding decrease in the d. c. content of the analog signal $\bar{Z}$ applied to the actuator 16. As the actuator 16 decreases the flow of energy through the throttle valve 14, the speed of the prime mover 10 decreases toward its original set point speed. In time, the speed of the prime mover 10 is stabilized at the set point speed again, the period difference $t_s-t_r$ goes to zero, and the number Z and the setting of the throttle valve 14 both assume a new decreased value reflecting the decrease in the load.

The gain of the governor servo loop, and therefore the response time of the governor, is dependent only on the gain $C_1$ of the comparator-integrator 40, which in turn is dependent solely on the frequency of the clock signal CLK2 for the integrator counter 400. Higher gain produces faster response and tighter control of the speed. As previously noted, speed control with the embodiment of FIG. 1 is isochronous.

Assume now that the governor of FIG. 1 is expanded into the droop governor configuration of FIG. 2. This expansion is accomplished merely by feeding the servo control number Z, appearing at the output Y1–Y12 of the holding register 430 in FIG. 6e, through the harness 152 to the Z input terminals of the reference signal generator 22 shown in FIG. 6b. The inputs Z' and T shown in FIG. 6b remain disabled. As noted previously, the four-input gating circuit 200 could be replaced by a two input multiplexer for use in the embodiment FIG. 2 and by a straight-through connection to the counter 160 when used in the embodiment of FIG. 1. The commutator 210 could similarly be simplified into a two-step device for use in the embodiment of FIG. 2.

With the number Z applied as an input to the reference signal generator 22, the governor shown in FIG. 2 operates in the following manner. An increase in the load 18 produces, with one exception, the same result as occurs with the governor of FIG. 1. As in the previous case, the increase in the period $t_s$ resulting from the decreased speed increases the period of counting up in the counter 400 (FIG. 6e) with respect to the period of counting down between successive MARK times. The number Z appearing at the outputs Y1–Y12 of the holding register 430 therefore is updated at the MARK time to successively higher values, which, through the digital-to-analog converter 46, tends to increase the setting of the throttle valve 14 via the actuator 16. As the speed of the prime mover 10 stabilize due to the increased energy flow from the source 12, the period difference $t_s-t_r$ decreases toward zero. Due to the feedback of the number Z to the reference signal generator 22, however, a further effect takes place. The number Z in this embodiment is a factor in the determination of the period $t_r$ as well as the period $t_s$. An increase in the number Z is reflected in the period $t_r$ of the pulses at the reference output 248 of the reference signal generator (FIG. 6b) because the counter 160 must now count down from a higher value of Z at the frequency $f_c$ of the clock CLK2 during that portion of the commutating cycle of the commutator 210 attributable to the input number Z. A corresponding increase in the entire commutating cycle (a measure of the period $t_r$) will result. It has been previously noted that the period $t_r$ is proportional to the algebraic sum of the binary coded input numbers R and Z applied to the generator 22. Therefore, as a result of the increase in the number Z, the period $t_r$ increases while the period $t_s$ stabilizes, so that the period difference $t_s-t_r$ goes to zero more quickly than in the embodiment of FIG. 1. Since the dynamic magnitude of the number Z reflects the duration as well as the magnitude of the period difference $t_s-t_r$, excessive values of Z and dangerous overshoot of the set point speed are prevented as a result of the stabilizing effect of the feedback path for the number Z. The reference pulses at the output 248 (FIG. 6b) will be of short duration for the embodiment of FIG. 2 because the S output of the flip-flop 214 is at logic 1 only while the unused inputs T and Z' (which, when not used, are connected to logic 1) are sampled. Since the effect of connecting the inputs T and Z to 1 will be to command counting up in the counter 160 from the all 1's condition during both the 00 and 10 states of the commutator 210, the actual duration of the logic 1 level at output 248 will be equal to two periods of the clock signal CLK2.

Feeding back the number Z to the reference signal generator 22 closes a loop around the integrator 40, so that, on a long term basis, a proportional path arises between the speed setting established by the number R and throttle position commanded by the number Z. A load increase requires an increased throttle position if speed is to be maintained. If the number R is not increased with increasing loads, a steady state error, or droop results in the actual speed of the prime mover.

If the droop governor of FIG. 2 is expanded into the isochronous governor configuration of FIG. 3, a further modification of the response to speed variations will result. The expansion is accomplished by effectively duplicating the primary governor loop of FIG. 1 for controlling the frequency $f_r$ of the reference pulses in an isochronous manner. The comparator-integrator 64, like the comparator-integrator 40 will comprise the circuit shown in FIGS. 6c–6e, and the auxiliary signal generator 50, like the reference signal generator 22, may be of the type shown in FIG. 6b. One input to the comparator-integrator 64 consists of the reference pulses having a period $t_r$, while the other input consists of the fixed frequency auxiliary pulses having a period $t_a$ corresponding to the desired set point speed. The reference correction number Z' is taken from the outputs $Y_1-Y_{12}$ of the holding register 430 in using the circuit of FIG. 6e as part of the comparator-integrator 64 of FIG. 3. One significant difference in the use of the circuit of FIG. 6e in the upper loop as compared to its use in the lower loop lies in the fact that the integrator clock signal CLK3 of the lower loop is replaced with a lower frequency clock in the upper loop. The results in a lower gain factor $C_2$ for the integrator 64 than for the integrator 40 and thereby prevents the upper loop governor effect from interfering with the stabilizing effect of the feedback path 47 for the number Z in the lower loop. If the gains $C_2$ and $C_1$ were equal, the stabilizing effect of feeding back the number Z to the generator 22 would be completely nullified.

With the gain $C_1$ greater than the gain $C_2$, the governor shown in FIG. 3 exhibits temporary droop while acting primarily as an isochronous governor on a long term basis. An increase in the load 18 on the prime mover 10 produces an immediate response in the lower or droop portion (that portion duplicated from FIG. 2) which is essentially identical to that described above in connection with the operation of the embodiment of FIG. 2. In other words, as the period $t_s$ increases, the servo control number Z changes to increase the setting on the throttle valve 14 and to additionally increase the period $t_r$ of the reference pulses from the reference signal generator 22. The period difference $t_s-t_r$ decreases quickly and speed instability is prevented by the immediate effect of the feedback of the number Z to adjust the value of the reference period $t_r$ toward the value of the period $t_s$. As the period $t_r$ increases, however, the upper governor loop slowly becomes effective. In the upper integrator 64 the count-up control gate 300 (FIG. 6c) is open for a longer period of time than is the count-down gate 302, with the result that the counter 400 counts up for longer periods of time (with respect to counting down) between successive MARK times. The holding register 430 (FIG. 6e) of the upper integrator 64, providing the number Z' at outputs Y1–Y12, is updated to successively higher binary values. The number Z' is fed on parallel lines shown as a harness 154 to the reference signal generator 22 (FIG. 6b) and connected to act in an opposite sense to the number Z. (see Table 130 of FIG. 6b). Because of the difference between the frequencies used for the counter clock source in the lower and upper integrators 40 and 64, and because the number Z' does not begin to increase until the number Z has effected a change in the period $t_r$ the number Z' initally increases more slowly than does the number Z. However, as the number Z reaches its maximum value, the number Z' begins to predominate and the period $t_r$ returns toward its original value. The number Z' will increase until the period difference $t_r-t_a$ equals zero.

In time, the increased number Z fed back to the generator 22 is completely offset by the number Z', the effect of the stabilizing feedback of Z on the period $t_r$ having been gradually eliminated. The speed of the prime mover 10 returns to the original set point speed determined by the number R. The periods $t_r$, $t_s$ and $t_a$ all become equal, and the numbers Z and Z' assume equal new values corresponding to the increased energy flow required to maintain set point speed with the increased load.

It is again noted that the equations for $B_1$ and $B_2$ shown in the diagram of FIGS. 3 and 4 include the constant offset number $+ M$ (equal to the maximumum count possible in the counter 160) which must necessarily be a factor in the total values of $B_1$ and $B_2$ if the circuit of FIG. 6$b$ is used for the generator 22. In the generator 22 the factor $+ M$ is inherent from the fact that a negative-sense effect (as from Z' or Z'') is obtained on the period $t_r$ by effectively adding the number M to equation for $B_1$ and then subtracting Z' or Z'' from that number. This effect will become clear from consideration of the timing diagrams of FIG. 8. The auxiliary signal generator 50 doesn't have negative-sense inputs in the embodiment shown, but the factor $+ M$ can be put into the auxiliary signal generator 50 by connecting the Z input lines 152 thereof (FIG. 6$b$) to logic 1. As noted previously, the offset number M serves a useful purpose in reducing the proportionate effect on the period $t_r$ due to the droop feedback of the number Z. The factor M should be taken into account in establishing the set point speed with the number R. Also, if the switch 75 is used to return the governor of FIG. 3 to droop operation, an additional input to the auxiliary signal generator 50 must be provided for entry of the constant number M.

Finally, the embodiment of FIG. 3 may be modified to provide the governor configuration illustrated in FIG. 4, which, as noted previously, provides a response known as "proportional plus integral" control. The only difference over the embodiment of FIG. 3 lies in the application of the speed pulses $f_s$, instead of the reference pulses $f_r$, to the comparator integrator 64 of the upper loop. The output number Z'' will be a digital representation of the time integral of the period difference $t_s - t_a$. Like the number Z', the number Z'' is connected to the reference signal generator 22 in opposition to the servo control number Z and gradually eliminates the effect of the feed back servo control number Z on the period $t_r$.

Response to a load increase will initially be identical to that described in connection with the governor of FIG. 2. The number Z gradually increases to adjust engine speed and the period $t_r$ simultaneously. The number Z'' begins to increase as soon as the period $t_s$ of the speed pulses increases, in contrast to the embodiment of FIG. 3 in which the reference correction signal Z' changes only after the period $t_r$ changes. The effect is similar in both cases, however, because the gain $C_2$ of the upper loop is considerably smaller than the gain $C_1$ of the lower loop so that temporary droop and the increased stability therefrom is not lost. The proportional response is obtained from the lower closed loop which gives an immediate adjustment of the throttle setting proportional to deviations between actual speed and set point speed, actual speed being reflected in the period $t_s$ and set point speed being reflected in the period $t_a$. The integral response is provided by the upper (open) which provides a gradual response, often termed reset, in accordance with the time integral of the difference between set point and actual speed. The integral correction, reflected in Z'', adjusts the operating point of the lower loop in response to prolonged speed changes. Response of this type, long recognized as desirable in the field of servo controls, is provided for speed control through the apparatus of the present invention.

From the foregoing description, it will be apparent that there has been brought to the art a speed governing system which, through digital techniques and all-digital design, provides a degree of stability, both dynamic and static, which has heretofore been unavailable in the governor art. In addition to providing an increased immunity to the effects of temperature and aging, the apparatus disclosed is inherently flexible and adaptable to a variety of useful governor configurations.

We claim:

1. In an electronic governor for maintaining the speed of a prime mover by controlling the flow of energy thereto, the combination comprising means including a transducer for producing a first recurring signal having a period $t_s$ which varies inversely according to changes in the speed of the prime mover;

a reference signal generator for producing a second recurring signal having a reference period $t_r$;

period difference integrating means including an up-down binary counter and counter logic circuit selectively controlling the direction of counting, said logic circuit being responsive to said first and second signals and causing said counter to count up and down respectively for intervals corresponding to the non-overlapping portions of partially overlapping respective periods $t_s$ and $t_r$;

a digital register means for sampling and holding the counter contents at the end of each up-and-down operation of said control logic circuit, said register having output means for producing a servo control signal digitally representing the numerical value of the time integral of the difference between said periods;

an auxiliary up-down counter connected to said binary counter as an expansion thereof;

overflow detecting means associated with said counter logic circuit and said auxiliary counter for setting said binary counter to its maximum or minimum count upon completion of said comparison operation if the expanded counter has at that time assumed a count above or below, respectively, the maximum or minimum count of said binary counter; and means including an actuator responsive to said servo control signal for correctively adjusting the energy flow to said prime mover to reduce the time difference between respective periods of said pulse trains to zero.

2. In an electronic governor for maintaining the speed of a prime mover by controlling the flow of energy thereto, the combination comprising means including a transducer for producing a first recurring signal having a period $t_s$ which varies inversely according to changes in the speed of the prime mover;

a period signal generator for producing a second recurring signal having a reference period $t_r$;

period difference integrating means including an up-down binary counter and a counter logic circuit selectively controlling the direction of counting, said logic circuit being responsive to said first and second signals and causing said counter to count up and down respectively for intervals corresponding to the non-overlapping portions of partially overlapping respective periods $t_s$ and $t_r$, said difference integrating means further including means for maintaining proportionality between (a) the difference in the counts in said binary counter between the beginning and end of the comparision operation and (b) the actual difference $t_s-t_r$ in the periods of the respective pulse trains—even if the instantaneous count exceeds the capacity of the binary counter during said comparison operation;

a digital register means for sampling and holding the counter contents at the end of each up-and-down operation of said control logic circuit, said register having output means for producing a servo control signal digitally representing the numerical value of the time integral of the difference between said periods; and means including an actuator responsive to said servo control signal for correctively adjusting the energy flow to said prime mover to reduce the time difference between respective periods of said pulse trains to zero.

3. In speed control apparatus having an actuator for controlling the rate of energy flow to a prime mover and a digital governor circuit producing a digital control signal numerically representing the desired rate of energy flow, the combination comprising a digital counter continuously driven at a preselected high frequency and adapted to selectively preset to starting count numbers, commutating means responsive to the achievement of a maximum or minumum count in said counter for a. presetting said counter to the instanteous numerical value of said control signal, and b. enabling said counter to alternately count down toward its minimum count and up toward its maximum count respectively from said numerical value, an output terminal associated with said commutating means and coupled to said actuator for producing a constant frequency squarewave having a duty cycle corresponding to the numerical magnitude of said control signal, and means for supplying input energy to the prime mover at a rate proportional to the average value of said squarewave.

4. The combination according to claim 3 wherein said commutating means produces a signal at said output terminal the voltage level of which is high during counting by said counter in one direction and low during counting of said counter in the other direction so that the d.c. content of the output signal is proportional to the numerical magnitude of said control signal.

5. In apparatus for controlling the rate of energy flow to a prime mover, digital means for producing a binary coded control signal having a binary magnitude proportional to the desired rate of energy flow, a source of clock pulses having a repetition rate several orders of magnitude in excess of the normal rate at which said binary control signal changes, an up-down counter selectively driven by said clock pulses in the up-count and down-count direction and adapted to be selectively preset to the value of said binary coded control signal, commutating means connected between said source of clock pulses and said counter and having first and second operative states for respectively controlling the up-count and down-count direction of counting, gating means associated with said counter and responsive to the achievement of the maximum or minimum count in said counter for a. presetting said counter to the instaneous binary value of said control signal, and b. toggling said commutating means from one operative state to the next in order to change the direction of counting, an output terminal connected to said commutating means for producing a train of output pulses having a pulse width proportional to the binary magnitude of said control signal, and means including an actuator connected to receive said output pulses for maintaining the energy flow to said prime mover at a rate proportional to the average d.c. content of said output pulses.

6. Apparatus in accordance with claim 5 for controlling the rate of energy flow to a prime mover wherein the average d.c. content of said output pulses is totally independent of the frequency of the clock pulses so that the response of said actuator to said binary control signal is independent of drift in the frequency of said clock source.

7. An electronic governor for controlling the flow of energy to a prime mover to stabilize the speed thereof comprising, manually settable means for generating a first digitally coded signal having a positive-sense numerical value representing the desired set point speed for said prime mover;

means including a transducer for producing a train of speed pulses at a frequency which varies with the actual speed of the prime mover;

reference generating means for producing a train of reference pulses;

comparison means adapted to receive said speed and reference pulses for producing a second digitally coded signal having a positive-sense value which varies in accordance with deviations in the speed of the prime mover from the desired set point;

means for producing a third digitally coded input signal having a negative-sense numerical value representing a modifying factor;

means including an actuator responsive to said second digitally coded signal for adjusting the energy flow to the prime mover to correct for said speed deviation, said reference generating means including 1. a multi-stage binary counter continuously driven at a high counting rate in the up-count or down-count direction;

2. means including a commutating logic circuit associated with said counter and having logic states corresponding to each of said digitally coded input signals, said logic circuit being responsive to the achievement of a maximum or minimum count in said counter to:

a. toggle to its next logic state, b. enable the respective digital input signal corresponding to said next logic state to be connected for setting the count in said counter to the magnitude of said respective input signal, and c. initiate counting in the up or down-counting direction depending upon the sense of said respective digital input signals, and 3. output means associated with said logic circuit for producing one of said reference pulses during each commutation cycle through all of said states.

8. An electronic governor for controlling the flow of energy to a prime mover to stabilize the speed thereof, comprising the combination according to claim 7 wherein said reference generating means initiates counting down from the numerical value of positive-sense input signals and initiates counting up from the numerical value of negative-sense input signals so that the period of said reference pulses varies linearly with the algebraic sum of said first, second and third digitally coded signals.

9. An electronic governor for controlling the flow of energy to a prime mover to stabilize the speed thereof comprising:

manually settable means for generating a first binary coded signal corresponding to the desired set point speed for said prime mover;

means including a transducer for producing a train of speed pulses having a frequency varying with the actual speed of the prime mover;

reference generating means for producing a train of reference pulses;

comparison means adapted to receive said speed and reference pulses for producing a second binary coded signal having a numerical value which varies in accordance with deviations in the speed of the prime mover from the desired set point; and means including an actuator responsive to said second binary coded signal for adjusting the energy flow to the prime mover to correct for said speed deviation, said reference generating means including 1. a source of clock pulses at a fixed high frequency;
2. a multi-stage binary counter driven by said clock pulses and adapted for sequentially stepping to the next lower count upon the occurrence of each of said pulses;
3. gating means having
   a. input terminals for simultaneously receiving the said first and second binary coded signals, the input terminals for each input signal having a corresponding binary index,
   b. controlled terminals connected to each stage of said counter for selectively presetting said counter with a selected one of said input signals, and
   c. control terminals for receiving a binary gating signal corresponding to a selected index and for controlling the transfer of the input signal corresponding to said index to said controlled terminals;
4. commutating means for generating said binary gating signal and operative to change the binary value of said signal from one of said indices to the next whenever said counter achieves its minimum count; and
5. an output terminal associated with said commutating means for supplying an output pulse during each cycle of said commutating means, whereby successive output pulses occur at intervals which are proportional to the algebraic sum of said binary coded input signals.

10. An electronic governor for controlling the flow of energy to a prime mover to stabilize the speed thereof comprising:

manually settable means for generating a first binary coded signal corresponding to the desired set point speed for said prime mover;

means including a transducer for producing a train of speed pulses having a frequency varying with the actual speed of the prime mover;

reference generating means for producing a train of reference pulses;

comparison means adapted to receive said speed and reference pulses for producing a second binary coded signal corresponding to deviations in the speed of the prime mover from the desired set point, means for producing a third binary coded signal having a numerical value representing a modifying factor; and means including an actuator responsive to said second binary coded signal for adjusting the energy flow to the prime mover to correct for said speed deviation, said reference generating means including 1. a multi-stage up-down binary counter,
2. a source of high frequency clock pulses selectively connected to drive said counter in an up-count or down-count direction,
3. gating means having
   a. input terminals for simultaneously receiving said binary input signals, the input terminals for each input signal having a corresponding binary index,
   b. controlled terminals connected to each stage of said counter for selectively presetting said counter with a selected one of said input signals, and
   c. control terminals for receiving binary gating signals corresponding to each index and for effecting the transfer of the input signal corresponding to said index to said controlled terminals and
4. commutating means responsive to the achievement of the maximum or minimum count in said counter for generating said binary gating signal and operative to change the binary value of said gating signal from one of said indices to the next, said commutating means further being operative to initiate counting down from the numerical values of said first and second input signals and counting up from the numerical value of said third input signal, and
5. an output terminal associated with said commutating means for supplying an output pulse during each cycle of said commutating means, whereby successive output pulses occur at intervals which vary linearly with the algebraic sum of said input signals.

11. An electronic governor for controlling the flow of energy to a prime mover to stabilize the speed thereof comprising:

manually settable means for generating a first binary coded signal corresponding to the desired set point speed for said prime mover;

means including a transducer for producing a train of speed pulses having a frequency varying with the actual speed of the prime mover;

reference generating means for producing a train of reference pulses;

comparison means adapted to receive said speed and reference pulses for producing a second binary signal corresponding to deviations in the speed of the prime mover from the desired set point, and means including an actuator responsive to said second binary coded signal for adjusting the energy flow to the prime mover to correct for said speed deviation;

said reference generating means including 1. a logic circuit and a continuously driven up-down binary counter controlled by said logic circuit so as to be preset in steps to the binary magnitude of each of said binary coded input signals, said counter further being controlled during the interval between steps to count up or down to its maximum or minimum count depending upon the sense of the then operative input signal; and 2. means associated with said logic circuit for producing one of said reference pulses during each cycle through said steps.

12. An electronic governor for controlling the flow of energy to a prime mover to stabilize the speed thereof, comprising the combination according to claim 11 wherein said logic circuit for controlling said binary counter includes a commutating device and gates responsive to the achievement of the maximum or minimum count in said counter for toggling said commutating device to its next operative state so as to preset said counter to the binary magnitude of the input signal corresponding to said operative state.

13. An electronic governor for controlling the flow of energy to a prime mover to stabilize the speed thereof, comprising the combination according to wherein 11 herin said logic circuit for controlling the binary counter includes a digital multiplex circuit connected to simultaneously receive said plurality of binary coded input signals and adapted to sequentially couple said input signals to said counter for setting the count in said counter to the binary magnitude of said respective input signals.

14. An electronic governor for controlling the flow of energy to a prime mover to stabilize the speed thereof, comprising the combination according to claim 12 wherein said commutating device is a second binary counter having a count capacity equal to the number of said binary coded input signals, said second counter providing a binary coded control signal capable of assuming binary values corresponding to its respective states, and wherein said logic circuit for controlling the binary counter further includes a digital multiplex circuit responsive to said control signal for presetting said up-down binary counter to the binary magnitude of the input signal corresponding to the then prevailing count in said second counter.

* * * * *